(12) United States Patent
Cohen et al.

(10) Patent No.: US 12,273,369 B2
(45) Date of Patent: **\*Apr. 8, 2025**

(54) SCALEABLE RISK MANAGEMENT ASSESSMENT SYSTEM AND METHOD

(71) Applicant: MANAGEMENT ANALYTICS, INC., Pebble Beach, CA (US)

(72) Inventors: Fred Cohen, Pebble Beach, CA (US); Chris Blask, Pebble Beach, CA (US)

(73) Assignee: MANAGEMENT ANALYTICS, INC., Pebble Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,058

(22) Filed: Apr. 2, 2024

(65) Prior Publication Data

US 2024/0267401 A1 Aug. 8, 2024

Related U.S. Application Data

(63) Continuation of application No. 15/212,159, filed on Jul. 15, 2016, now Pat. No. 11,997,123.

(60) Provisional application No. 62/193,043, filed on Jul. 15, 2015.

(51) Int. Cl.
*H04L 9/40* (2022.01)
*G06F 21/56* (2013.01)

(52) U.S. Cl.
CPC ...... *H04L 63/1433* (2013.01); *H04L 63/1425* (2013.01); *G06F 21/56* (2013.01); *H04L 63/02* (2013.01); *H04L 63/0218* (2013.01); *H04L 63/1416* (2013.01); *H04L 63/20* (2013.01)

(58) Field of Classification Search
None
See application file for complete search history.

(56) References Cited

U.S. PATENT DOCUMENTS

| | | |
|---|---|---|
| 4,803,642 A | 2/1989 | Muranaga |
| 5,032,979 A | 7/1991 | Hecht et al. |
| 5,253,330 A | 10/1993 | Ramacher et al. |
| 5,414,833 A | 5/1995 | Hershey et al. |
| 5,488,715 A | 1/1996 | Wainwright |
| 5,557,742 A | 9/1996 | Smaha et al. |

(Continued)

FOREIGN PATENT DOCUMENTS

| | | | | |
|---|---|---|---|---|
| CN | 102413011 B | * | 9/2015 | |
| WO | WO-2014055395 A2 | * | 4/2014 | ......... G06F 16/9535 |
| WO | WO2014150507 A2 | | 9/2014 | |

OTHER PUBLICATIONS

Mark S. Beasley, Richard Clune, and Dana R. Hermanson; (Enterprise risk management: An empirical analysis of factors associated with the extent of implementation); pp. 11; Published in (Year: 2005).*

(Continued)

*Primary Examiner* — Eleni A Shiferaw
*Assistant Examiner* — Ali H. Cheema
(74) *Attorney, Agent, or Firm* — Manatt, Phelps & Phillips, LLP

(57) ABSTRACT

A system and method perform assessments of technical systems or institutions by applying one or more standards of practice to one or more entities. The system and method may apply those one or more standards of practice in a distributed piece-meal fashion allowing less trained personnel to accomplish more assessments with lower cost and in less time.

28 Claims, 24 Drawing Sheets

(56) References Cited

U.S. PATENT DOCUMENTS

| | | |
|---|---|---|
| 5,606,668 A | 2/1997 | Shwed |
| 5,621,889 A | 4/1997 | Lermuzeaux et al. |
| 5,732,200 A | 3/1998 | Becker et al. |
| 5,796,942 A | 8/1998 | Esbensen |
| 5,812,128 A | 9/1998 | Sterling, IV |
| 5,848,261 A | 12/1998 | Farry et al. |
| 5,926,794 A | 7/1999 | Fethe |
| 5,966,650 A | 10/1999 | Hobson et al. |
| 6,070,244 A | 5/2000 | Orchier et al. |
| 6,088,804 A | 7/2000 | Hill et al. |
| 6,145,084 A | 11/2000 | Zuili et al. |
| 6,188,403 B1 | 2/2001 | Sacerdoti |
| 6,222,540 B1 | 4/2001 | Sacerdoti |
| 6,298,445 B1 | 10/2001 | Shostack et al. |
| 6,351,680 B1 | 2/2002 | All et al. |
| 6,507,766 B2 | 1/2003 | Khan |
| 6,535,775 B1 | 3/2003 | Bagepalli et al. |
| 6,647,400 B1 | 11/2003 | Moran |
| 6,671,281 B1 | 12/2003 | Tsuda |
| 6,738,916 B1 | 5/2004 | Gladden et al. |
| 6,771,293 B1 | 8/2004 | Josephson et al. |
| 6,980,927 B2 | 12/2005 | Tracy |
| 7,062,458 B2 | 6/2006 | Maggioncalda |
| 7,072,825 B2 | 7/2006 | Wang et al. |
| 7,496,533 B1 | 2/2009 | Keith |
| 7,516,227 B2 | 4/2009 | Cohen |
| 7,660,705 B1 | 2/2010 | Meek et al. |
| 7,693,743 B2 | 4/2010 | Alasaarela |
| 8,095,492 B2 | 1/2012 | Cohen |
| 8,484,149 B1 | 7/2013 | Kelly |
| 9,092,631 B2 | 7/2015 | Muller et al. |
| 9,100,430 B1 | 8/2015 | Seiver et al. |
| 9,292,695 B1 | 3/2016 | Bassett |
| 9,330,262 B2 | 5/2016 | Salehie et al. |
| 9,800,604 B2 | 10/2017 | Knapp et al. |
| 11,023,901 B2 | 6/2021 | Cohen |
| 2001/0027455 A1 | 10/2001 | Abulleil et al. |
| 2002/0013720 A1 | 1/2002 | Ozono et al. |
| 2002/0038321 A1 | 3/2002 | Keeley |
| 2002/0042731 A1 | 4/2002 | King et al. |
| 2002/0111835 A1 | 8/2002 | Hele |
| 2002/0169658 A1 | 11/2002 | Adler |
| 2003/0033191 A1 | 2/2003 | Davies et al. |
| 2003/0088381 A1 | 5/2003 | Henry et al. |
| 2003/0120577 A1 | 6/2003 | Sakui et al. |
| 2003/0149571 A1 | 8/2003 | Francesco et al. |
| 2003/0208429 A1 | 11/2003 | Bennett |
| 2003/0229509 A1 | 12/2003 | Hall et al. |
| 2004/0030592 A1 | 2/2004 | Buck et al. |
| 2004/0085316 A1 | 5/2004 | Malik |
| 2004/0102923 A1 | 5/2004 | Tracy et al. |
| 2004/0102940 A1 | 5/2004 | Lendermann et al. |
| 2004/0162752 A1 | 8/2004 | Dean et al. |
| 2004/0210574 A1 | 10/2004 | Aponte et al. |
| 2004/0236655 A1 | 11/2004 | Scumniotales et al. |
| 2005/0004789 A1 | 1/2005 | Summers |
| 2005/0043922 A1 | 2/2005 | Weidl et al. |
| 2005/0049987 A1 | 3/2005 | Meek et al. |
| 2005/0060213 A1 | 3/2005 | Lavu |
| 2005/0091077 A1 | 4/2005 | Reynolds |
| 2005/0209866 A1 | 9/2005 | Veeningen et al. |
| 2006/0047561 A1 | 3/2006 | Bolton |
| 2006/0085434 A1 | 4/2006 | Mah et al. |
| 2006/0106570 A1 | 5/2006 | Feldman |
| 2006/0121436 A1 | 6/2006 | Kruse et al. |
| 2006/0129439 A1 | 6/2006 | Arit et al. |
| 2007/0115993 A1 | 5/2007 | Cohen |
| 2007/0156814 A1 | 7/2007 | Cohen |
| 2007/0186283 A1 | 8/2007 | Brumbaugh |
| 2007/0194097 A1 | 8/2007 | Jones |
| 2007/0239696 A1 | 10/2007 | Xu |
| 2008/0005677 A1 | 1/2008 | Thompson |
| 2008/0015889 A1 | 1/2008 | Fenster |
| 2008/0036767 A1 | 2/2008 | Janzen |
| 2008/0047018 A1 | 2/2008 | Baudoin et al. |
| 2008/0140688 A1 | 6/2008 | Clayton et al. |
| 2008/0192056 A1 | 8/2008 | Robertson |
| 2009/0006156 A1 | 1/2009 | Hunt et al. |
| 2009/0113312 A1 | 4/2009 | Schoenberg |
| 2009/0126022 A1 | 5/2009 | Sakaki |
| 2009/0265787 A9* | 10/2009 | Baudoin ............... G06Q 40/08 711/E12.001 |
| 2009/0307159 A1 | 12/2009 | Pinckney |
| 2010/0005043 A1* | 1/2010 | Yamashita ............ G06N 20/00 706/47 |
| 2010/0114634 A1 | 5/2010 | Christiansen |
| 2010/0145715 A1 | 6/2010 | Cohen |
| 2010/0153156 A1* | 6/2010 | Guinta ............... G06Q 10/0635 706/54 |
| 2010/0179843 A1 | 7/2010 | Johnson |
| 2010/0274753 A1 | 10/2010 | Liberty et al. |
| 2010/0305993 A1 | 12/2010 | Fisher |
| 2011/0047087 A1 | 2/2011 | Young |
| 2011/0126111 A1 | 5/2011 | Gill et al. |
| 2011/0189645 A1 | 8/2011 | Leininger |
| 2011/0238566 A1 | 9/2011 | Santos |
| 2011/0307806 A1 | 12/2011 | Hills |
| 2012/0084867 A1 | 4/2012 | Baggett |
| 2012/0180133 A1* | 7/2012 | Al-Harbi ............. H04L 63/1433 726/25 |
| 2012/0185479 A1 | 7/2012 | Korver |
| 2012/0310961 A1 | 12/2012 | Callison |
| 2013/0031037 A1 | 1/2013 | Brandt et al. |
| 2013/0042007 A1 | 2/2013 | Linton et al. |
| 2013/0097706 A1* | 4/2013 | Titonis .................. G06F 21/566 726/22 |
| 2013/0097709 A1 | 4/2013 | Basavapatna |
| 2013/0179215 A1* | 7/2013 | Foster .................... G06Q 10/00 705/7.28 |
| 2013/0211927 A1* | 8/2013 | Kellogg ............. G06Q 30/0631 705/14.73 |
| 2013/0275176 A1 | 10/2013 | Brown |
| 2013/0311224 A1 | 11/2013 | Heroux |
| 2014/0222694 A1 | 8/2014 | Chen |
| 2014/0278566 A1 | 9/2014 | McLaughlin |
| 2016/0044057 A1 | 2/2016 | Chenette |
| 2016/0078551 A1 | 3/2016 | Samuels |
| 2016/0092884 A1 | 3/2016 | Weaver |
| 2016/0125296 A1 | 5/2016 | Filipuzzi |
| 2016/0246991 A1 | 8/2016 | Bell et al. |
| 2019/0182289 A1 | 6/2019 | White |
| 2022/0375622 A1 | 11/2022 | Gnanasambandam |

OTHER PUBLICATIONS

Committee of Sponsoring Organizations of the Treadway Commission "COSO"; (Internal Control—Integrated Framework: Framework and Appendices); pp. 195; Published in Sep. 2012.*

Cohen, Fred, "Computer Viruses", (Year:1985), 117 pages.

Cohen, Fred, "Models of Practical Defenses Against Computer Viruses" Electrical and Computer Engineering Department University of Cincinnati, 1989, downloaded on Jul. 11, 2023 from all.net/books/integ/vmodels.html.

Cronje, Johannes, "Paradigms Regained: Toward Integrating Objectivism and Constructivism in Instructional Design and the Learning Sciences," ETR&D, vol. 54, No. 4, pp. 387-416, 2006. (Year: 2006).

Smart et al., "Developing a decision-making framework for implementing purchasing synergy: a case study," International Journal of Physical Distribution & Logistics Management, vol. 37 No. 1, 2004. (Year: 2004), 27 pages.

Winston, P., "Artificial Intelligence", Massachusetts Institute of Technology, Addison-Wesley, Year 1992, Chapter 7, Mycin Diagnoses_ pp. 130-132.

Cohen, Fred, "A Note on the Role of Deception in Information Protection", c. Year 1998, All.Net, 13 pages.

Cohen, et al., "A Framework for Deception", Computers and Security, Year: 2001, All.Net, 67 pages.

Cohen, "The Use of Deception Techniques: Honeypots and Decoys", Year: 2004, All.Net, 24 pages.

Cohen, "A Mathematical Structure of Simple Defensive Networks Deceptions", Fred Cohen & Associates, c. Year 1999, All.Net, 12 pages.

(56) References Cited

OTHER PUBLICATIONS

Cohen, et al., "Red Teaming Experiments with Deception Technologies", Year: 2001, All.Net, 25 pages. doi:10.1016/j.jrp.2010.04.001, 23 pages.

Pennebaker, et al., "Linguistic Inquiry and Word Count: LIWC2015—Operator's Manual", Year 2015, Austin, TX: Pennebaker Conglomerates (www.LIWC.net), 23 pages.

Yankelovich, et al., "Rediscovering Market Segmentation", Harvard Business Review, Feb. 2006, http://www.hbr.org/, 12 pages.

Beatty, et al., "Problems with Vals in International Marketing Research: an Example From an Application of the Empirical Mirror Technique", in NA—Advances in Consumer Research vol. 15, eds. Micheal J. Houston, Provo, UT: Association for Consumer Research, Year 1988, pp. 375-380.

Maslow, A.H., "A Theory of Human Motivation", Year: 1943, Brooklyn College, pp. 370-396.

Grandori, A., "A Prescriptive Contingency View of Organizational Decision Making", Year: Jun. 1984, Sage Publications, Inc., Cornell University, Administrative Science.

Fred Cohen, "Frauds, Spies, and Lies", ASP Press, (Year 2005), 234 pages.

Evrim Furuncu and Ibrahim Sogukpinar, "Scalable risk assessment method for cloud computing using game theory (CCRAM)", (Gebze Institute of Technology Computer Engineering Department, Kocaeli, Turkey) 7 pages, dated: (Year: 2015).

Jehyun Lee, Heejo Lee, Hoh Peter, "Scalable Attack Graph for Risk Assessment" by (Division of Computer and Communication Engineering, Korea University, Seoul, Korea) 6 pages; Dated: Aug. 15, 2014.

Yarkoni, "Personality in 100,000 Words: A large-scale analysis of personality and word use among bloggers", University of Colorado at Boulder, NIH Public Access, Jun. 1, 2010, 23 pages.

Karen Scarfone, Murugiah Souppaya, Amanda Cody and Angela Orebaugh; "Technical Guide to Information Security Testing and Assessment" by NIST; pp. 80; Sep. 2008.

\* cited by examiner

| Managed or Optimizing | Fully integrate risk aggregation and interdependency into operations and change management practices. |

Risk aggregation control approach

Basis:

Do ad-hoc risk aggregation and interdependency mitigation when people or events bring it to the fore.

Enterprises of all sizes have historically done this, but risk aggregation is a serious problem and the root cause of many large losses and some business collapses. For an organization that is large and complex, this is simply too dangerous and represents a lack of diligence. Systematic approaches are called for when risks are nontrivial.

Analyze aggregated and interdependency risk for systems that have obvious business criticality.

This begs the question of what is obvious and to whom. A good quote comes from Virgil Gligor who, when discussing a computer security related issue said:

*"If you think about it intensely for three years, it's obvious"*

Things in information protection are complex and only become obvious once you have studied them for a long time. An alternative is to get more systematic and use checklists or similar tools that cover the issues.

Do a periodic risk aggregation and interdependency analysis and mitigate problems on a scheduled basis.

Any enterprise that is large enough to warrant redundancy and in which a systematic change control process is not in place will fall into this category. If a strong and systematic change control process is used, then it will also include this coverage. Periodic review is appropriate through the audit process, but unnecessary from a security execution perspective because it is already covered in real-time by the change management process.

Fully integrate risk aggregation and interdependency into operations and change management practices.

This approach is preferred for medium and high risk environments that should be under strong change controls and thus should deal with risk aggregation issues effectively as part of their normal protection processes.

Risk aggregation and interdependency defenses are really the reason that redundancy is used, but some issues, like backups and multiple data centers are more obvious than other risk aggregation issues like localization and employee dependencies. A full scale risk aggregation analysis is reasonable and prudent for medium sized businesses and mandatory for large enterprises and public companies.

Risk aggregation should generally consider all of the interdependencies of business utility. This includes but is not limited to: people, programs, data, libraries, files, input and output, operating systems, configurations, domain name services, identity management services, back end processing and storage, protocols, platforms, networks, wires, routing, access, power, cooling, heating, air, communications, government, environment, supplies, safety, health, and facilities. Each of these aggregate risks due to multiple uses and all of those uses have to be summed in order to understand the risks associated with integrity, availability, confidentiality, use control, and accountability and the lack thereof that may result from any identifiable failure modes.

Brought to you by all.net from TestBed

Rote decision:

Based on the maturity level of the enterprise, use the appropriate document control processes.

| Maturity level | Documentation process |
|---|---|
| None or Initial | Use no or minimal documentation of the protection process. |
| Repeatable | Create written documents reflecting all official management decisions and retain them. |
| Defined | Create a document control system for protection-related information. |
| Managed or higher | Integrate protection-related documentation into the enterprise business records and document control system. |

*Protection Documentation Approach*

Basis:

Use no or minimal documentation of the protection process.

Enterprises who have minimal protection programs and with immature programs tend to have inadequate documentation to operate systematically.

Create written documents reflecting all official management decisions and retain them.

Written documents of the protection program are a fundamental starting point to the creation of a systematic approach that allows actions to be tracked to decisions and decisions to be made and reviewed systematically.

Create a document control system for protection-related information.

Rote decision:

The maturity level of the enterprise should dictate the approach to risk aggregation control.

| Maturity level | Risk aggregation control approach |
|---|---|
| None or Initial | Do ad-hoc risk aggregation and interdependency mitigation when people or events bring it to the fore. |
| Repeatable | Analyze aggregated and interdependency risk for systems that have obvious business criticality. |
| Defined | Do a periodic risk aggregation and interdependency analysis and mitigate problems on a scheduled basis. |
| Managed or Optimizing | Fully integrate risk aggregation and interdependency into operations and change management practices. |

*Risk aggregation control approach*

Basis:

Do ad-hoc risk aggregation and interdependency mitigation when people or events bring it to the fore.

Enterprises of all sizes have historically done this, but risk aggregation is a serious problem and the root cause of many large losses and some business collapses. For an organization that is large and complex, this is simply too dangerous and represents a lack of diligence. Systematic approaches are called for when risks are nontrivial.

Analyze aggregated and interdependency risk for systems that have obvious business criticality.

This begs the question of what is obvious and to whom. A good quote comes from Virgil Gligor who, when discussing a computer security-related issue said:

*"If you think about it intensely for three years, it's obvious"*

*FIG. 11B*

Select scenario to work on or create a new one:

| Date | UID | Element | Item | Type | Value | Comment |
|---|---|---|---|---|---|---|
| 2015-05-02T11-23-21 | fcatalinet | Creation | Description | INPUT | Test client 1 | Initial creation |
| 2015-05-03T13-30-23 | fcatalinet | Creation | Description | INPUT | Test Client Juwels Smartly | Initial creation |
| 2015-05-03T16-29-00 | fcatalinet | Creation | Description | INPUT | Newest test gig | Initial creation |
| 2015-05-03T16-35-24 | fcatalinet | Creation | Description | INPUT | Test 4 | Initial creation |

SCALEABLE RISK MANAGEMENT ASSESSMENT SYSTEM AND METHOD

RELATED APPLICATIONS

This applications claims priority under 35 USC 120 and is a continuation of U.S. patent application Ser. No. 15/212,159 filed Jul. 15, 2016 entitled "Scaleable Cyber Security Assessment System and Method" that, in turn, claims the benefit under 35 USC 119(e) to and priority under 35 USC 120 to U.S. Provisional Patent Application Ser. No. 62/193,043 filed on Jul. 15, 2015 and entitled "Scaleable Cyber Security Assessments", the entirety of both of which are incorporated herein by reference.

COPYRIGHT NOTICE

Pursuant to 37 C.F.R. 1.71(e), applicant notes that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

APPENDIX

This application is being filed with an appendix (final_source_code_appendix.txt) that is part of the specification. Any appendices and all other papers filed herewith, including papers filed in any attached Information Disclosure Statement (IDS), are incorporated by reference. The appendix contains executable computer code related to specific embodiments at various stages of development. Among other portions, the appendix sets out a software tool in executable code and descriptions of using that tool and example standards of practice according to specific embodiments. The portions of computer program code can be executed on an appropriately configured computing device to operate according to various descriptions herein. The appendix includes examples of input and output as will be understood may be used in information systems, such as systems including a graphical user interface. The appendix further includes instructional information that may be displayed during execution regarding how to use various components enabled by the computer program code and as described herein. The methods of this disclosure may be practiced on a variety of information systems and may be encoded in any appropriate computer code or language. Permission is granted to make copies of the appendices solely in connection with the making of facsimile copies of this patent document in accordance with applicable law; all other rights are reserved, and all other reproduction, distribution, creation of derivative works based on the contents, public display, and public performance of the appendix or any part thereof are prohibited by the copyright laws.

FIELD

The disclosure relates to processes, logic systems, methods, and computer program products. More particularly, it relates to communication systems, computer systems and associated systems and devices and methods that facilitate assessments for cyber security and other fields with similarly complex issues by applying one or more standards of practice. Standards of practice in some embodiments are directed to cyber security practices and other practices of a complex organization or institution. In further embodiments, one or more methods may be implemented on a data handling device or system, such as a computer or other information enabled device. In further embodiments, methods and/or systems for gathering information or performing one or more analysis or ratings are deployed over a communication network. In one embodiment decisions regarding decision-making processes in an enterprise are assessed. In a further embodiment insurance evaluations for cybersecurity can be assessed. In another embodiment, industrial control system protections can be assessed.

BACKGROUND

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

The assessment of protection posture has existed since the 1980s. Early examples of methodologies to support protection posture assessment, include an approach written up by one of the present inventors in Cohen, "Protection and Security on the Information Superhighway" (1995) in the chapter "How To Do A Protection Posture Assessment" (ISBN-13: 978-0471113898). Between then and now, various processes have been used for protection assessment. Existing and described methods work in many circumstances and are often considered a standard of assessment methodologies in the information protection space. However, there is a substantial limitation of such approaches in that they are expensive and time consuming. As a result, worldwide, a limited number of such assessments are undertaken, perhaps a few hundreds or thousands in total per year. Cost is generally hundreds of thousands of dollars per assessment, and the time to complete an assessment is on the order of a person-year. Further information regarding Information Protection Posture Assessments is available at co-inventor F. Cohen's websites at all(.)net/IPPA/index.html and the links provided therein.

In a practical sense, this approach is inherently limiting. The current population of certified information system security professionals (i.e., CISSPs) is only about 94,000, and they are nearly 100% employed per the 2015. (ISC)$^2$ Global Information Security Workforce Study) If it takes one person year per assessment and there are 94,000 people, that means that if all of the available CISSPs in the World performed nothing but assessments all the time, assessing the ~200,000 water systems in the US would take 2 years, and assessing the millions of businesses in the US would take decades. The Worldwide demand so outstrips supply that there is no practical way to apply this approach on a global basis.

BRIEF DESCRIPTION OF THE DRAWINGS

Figure 1:
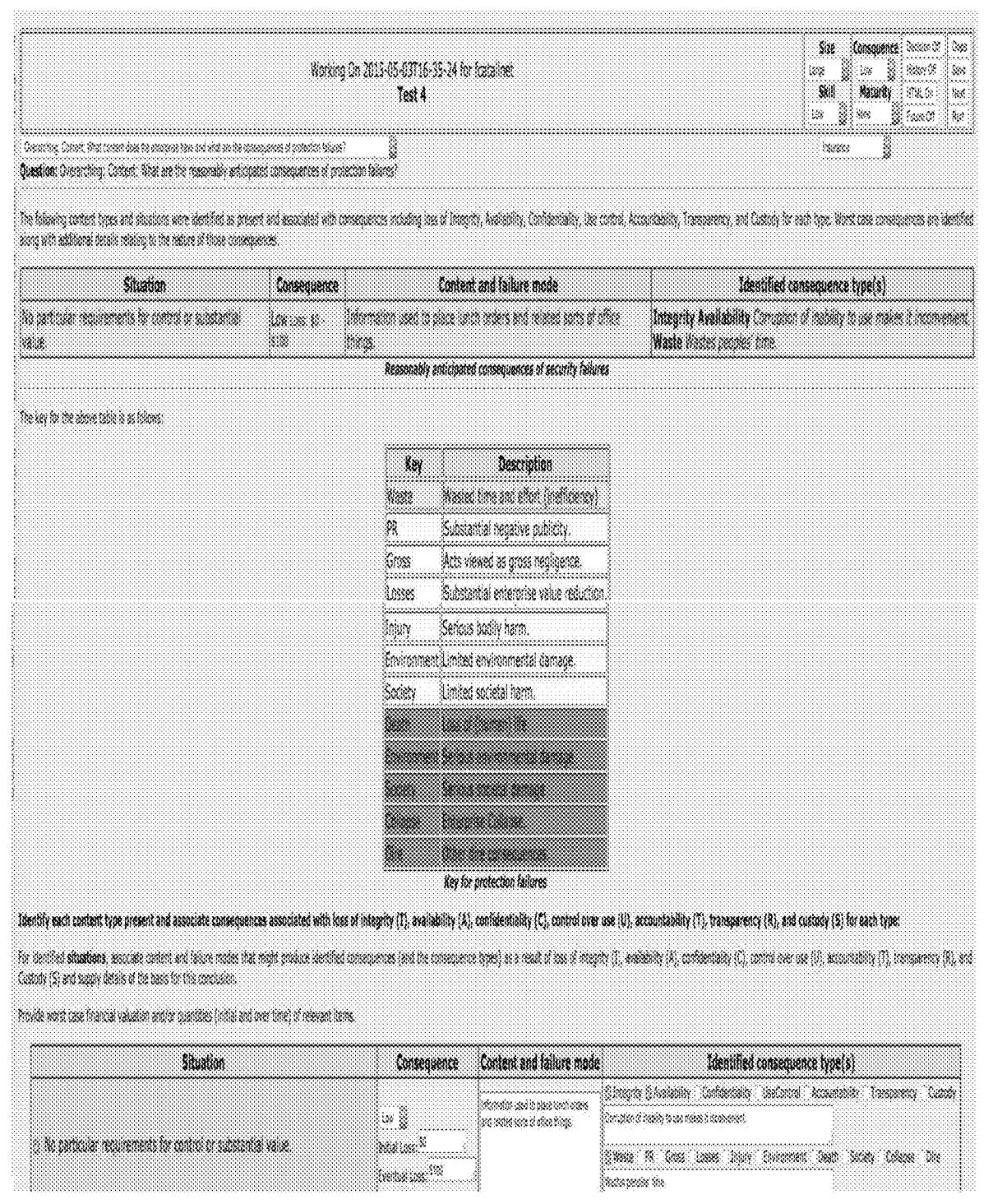

FIG. 1 is a diagram illustrating an example user interface for an example implementation according to specific embodiments showing, at the bottom, part of the input mechanism, at the top, another part of the input mechanism, and in the middle, the current state of the output.

Figure 2A:
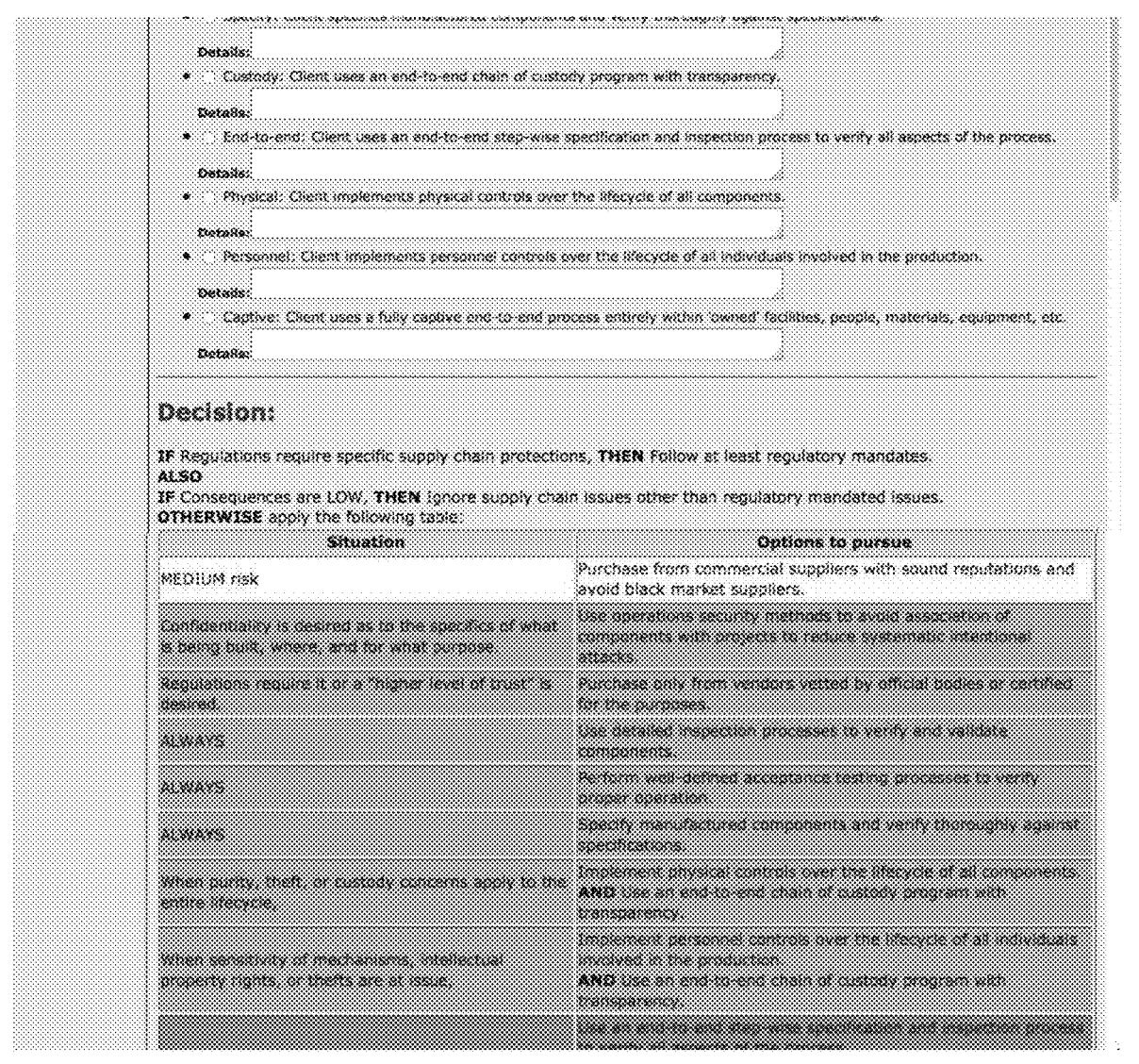
Figure 2B:
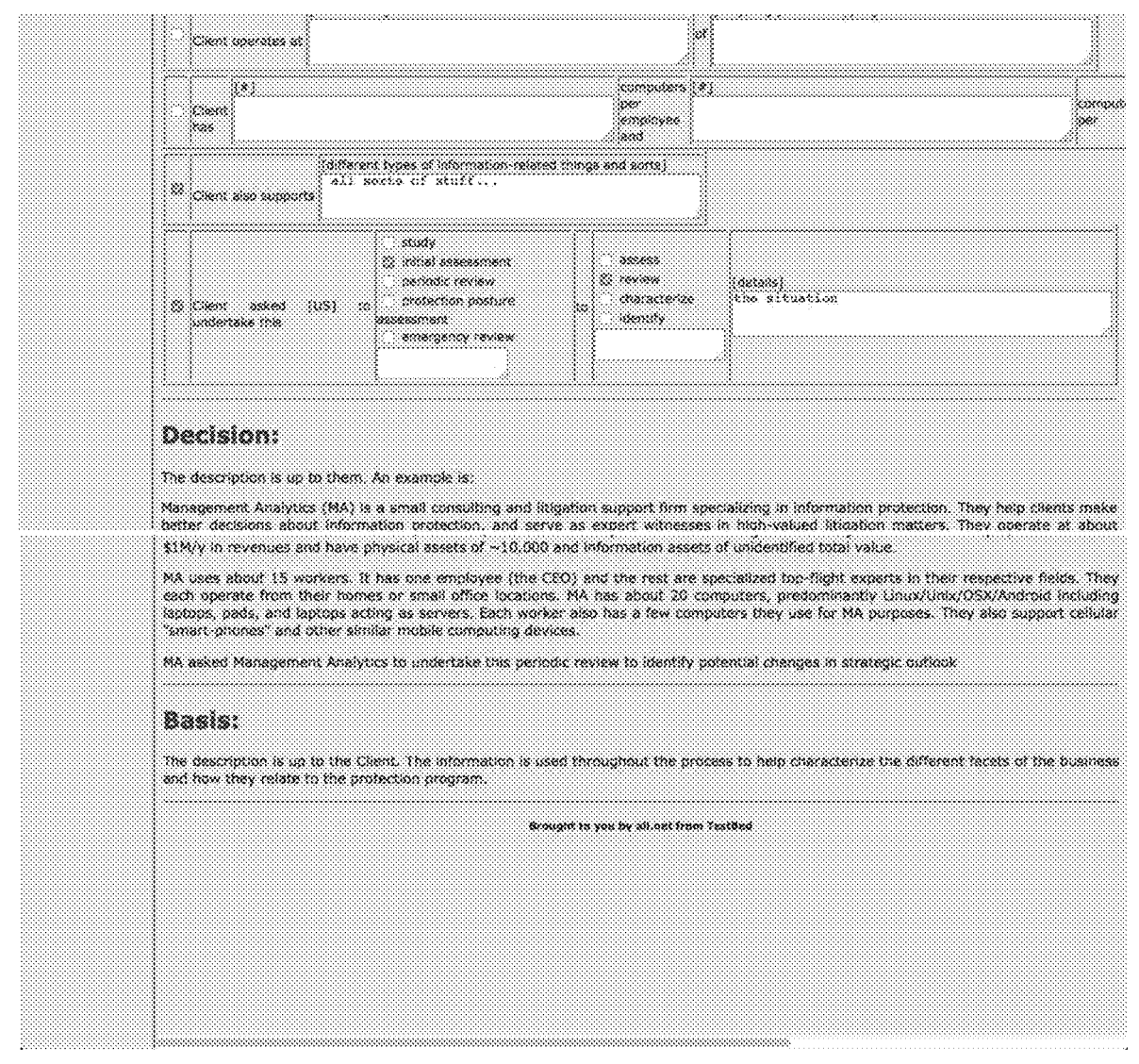

FIGS. 2A-B illustrate an example user interface input checklist with comments according to specific embodiments.

Figure 3A:
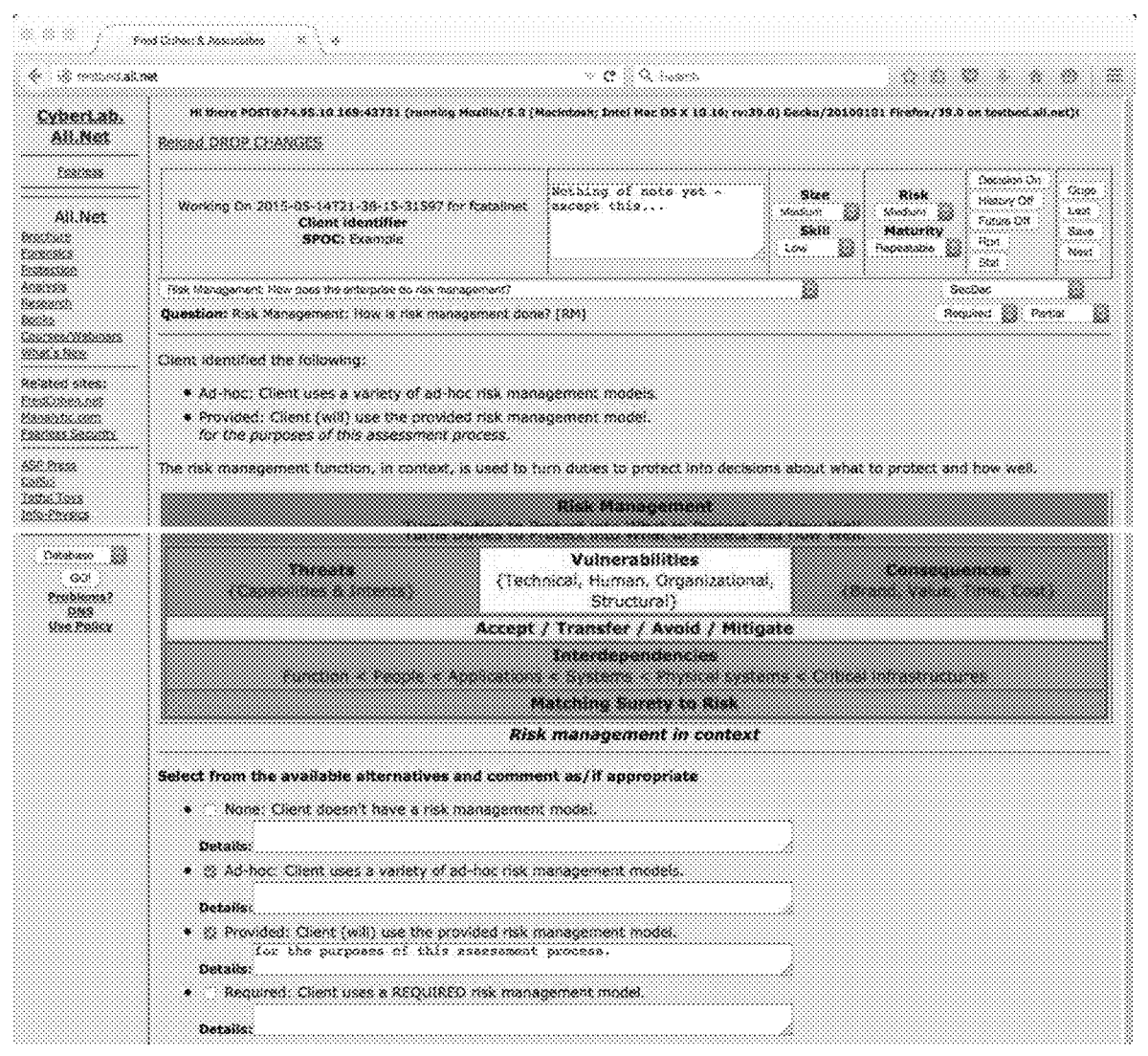

FIGS. 3A-B illustrate an example user interface input checklist with editable figure according to specific embodiments.

Figure 4A:
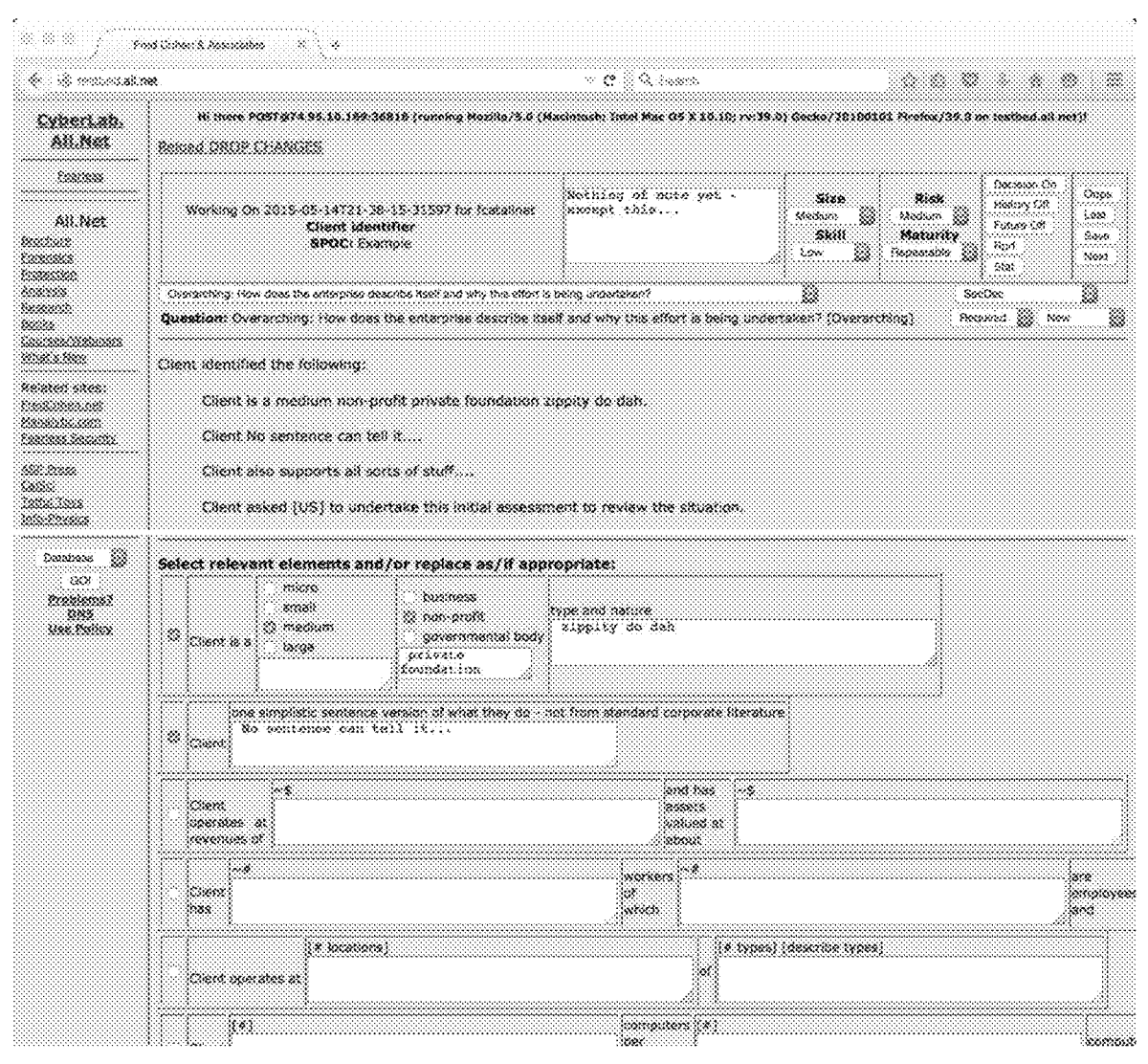
Figure 4B:
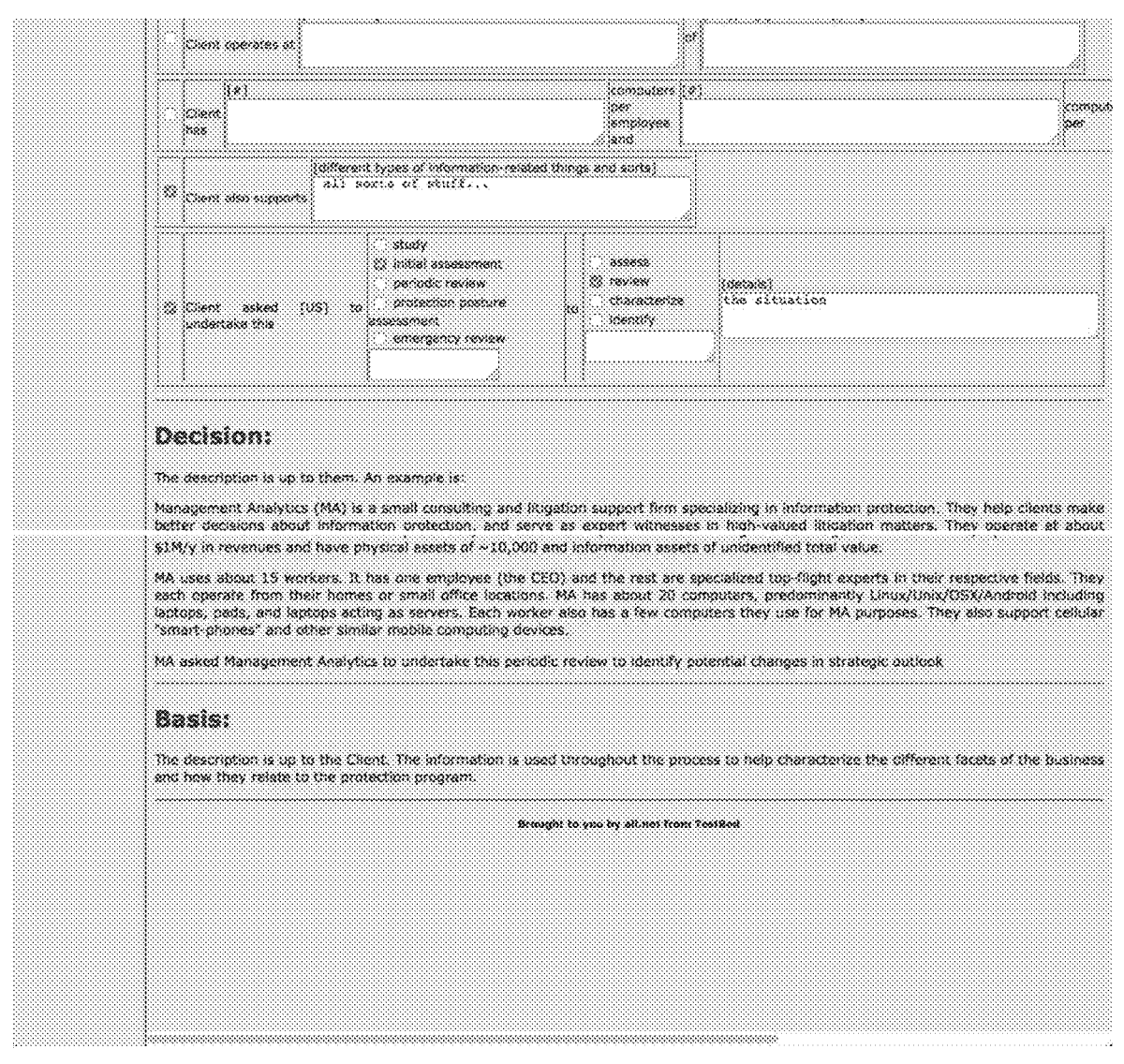

FIGS. 4A-B illustrate an example user interface with sentence or complex sentence input according to specific embodiments.

Figure 5:
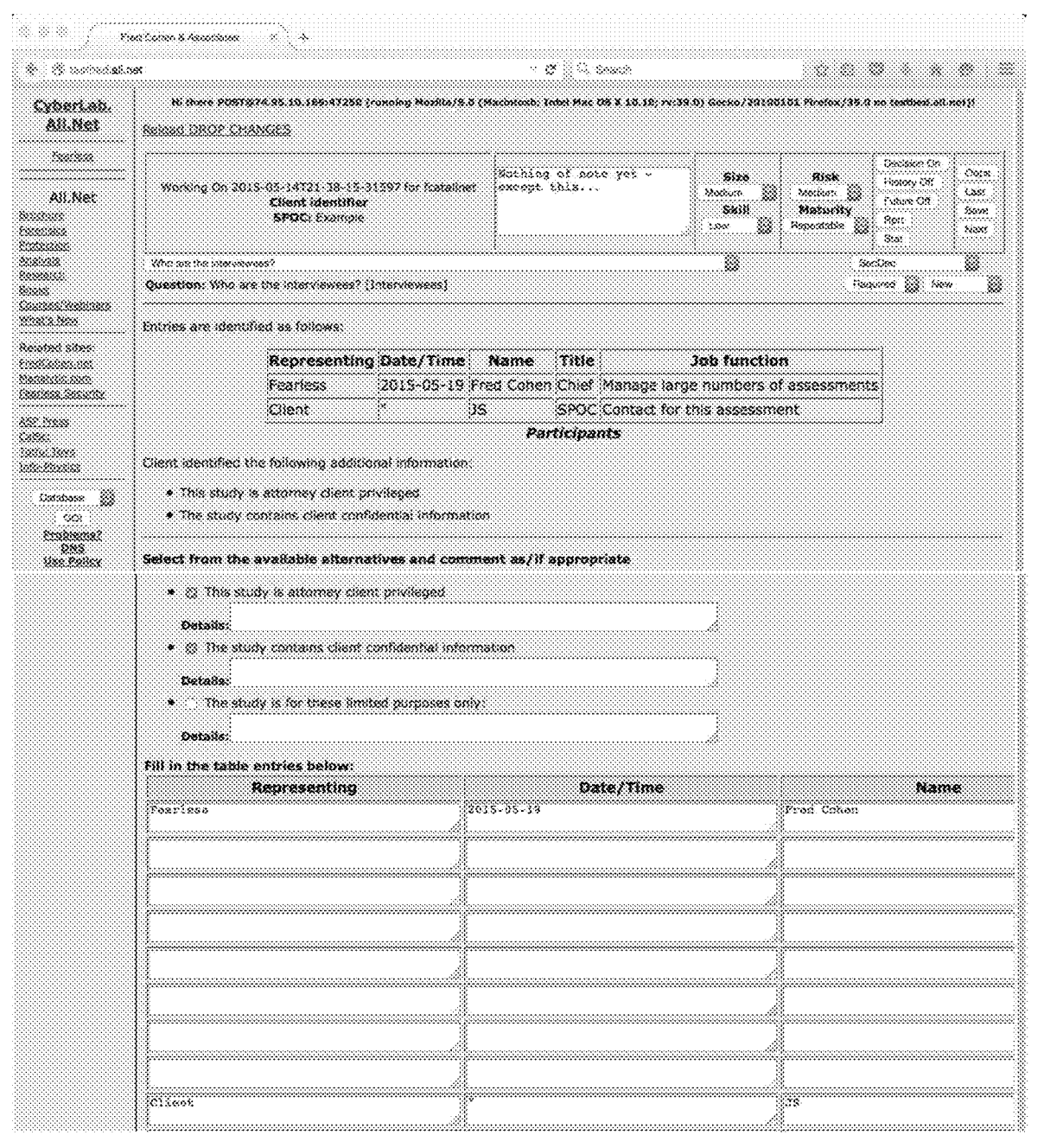

FIG. 5 illustrate an example user interface table entry input according to specific embodiments.

Figure 6A:
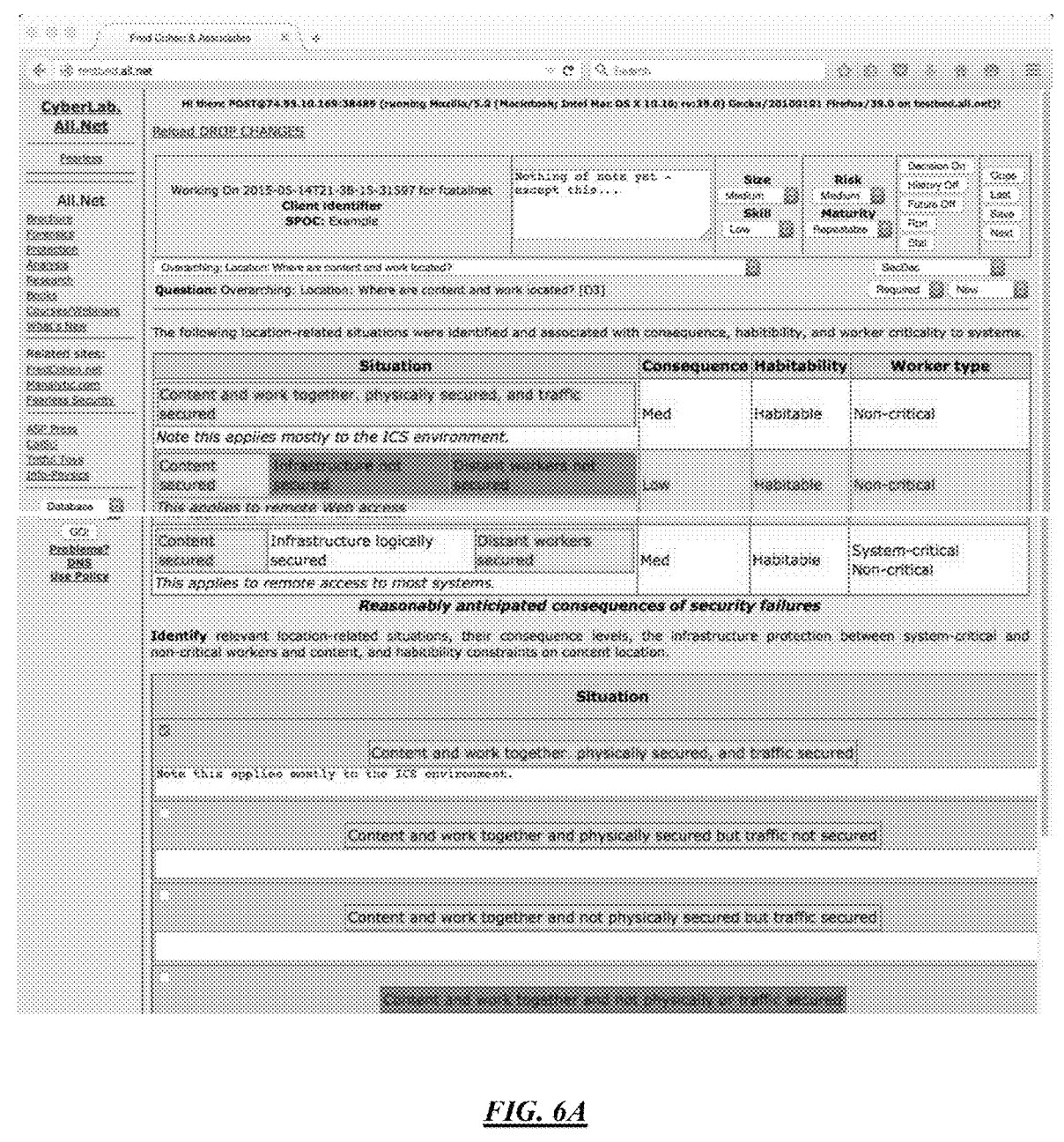

FIGS. 6A-B illustrate an example user interface for inputting a complex set of alternatives according to specific embodiments.

Figure 7A:
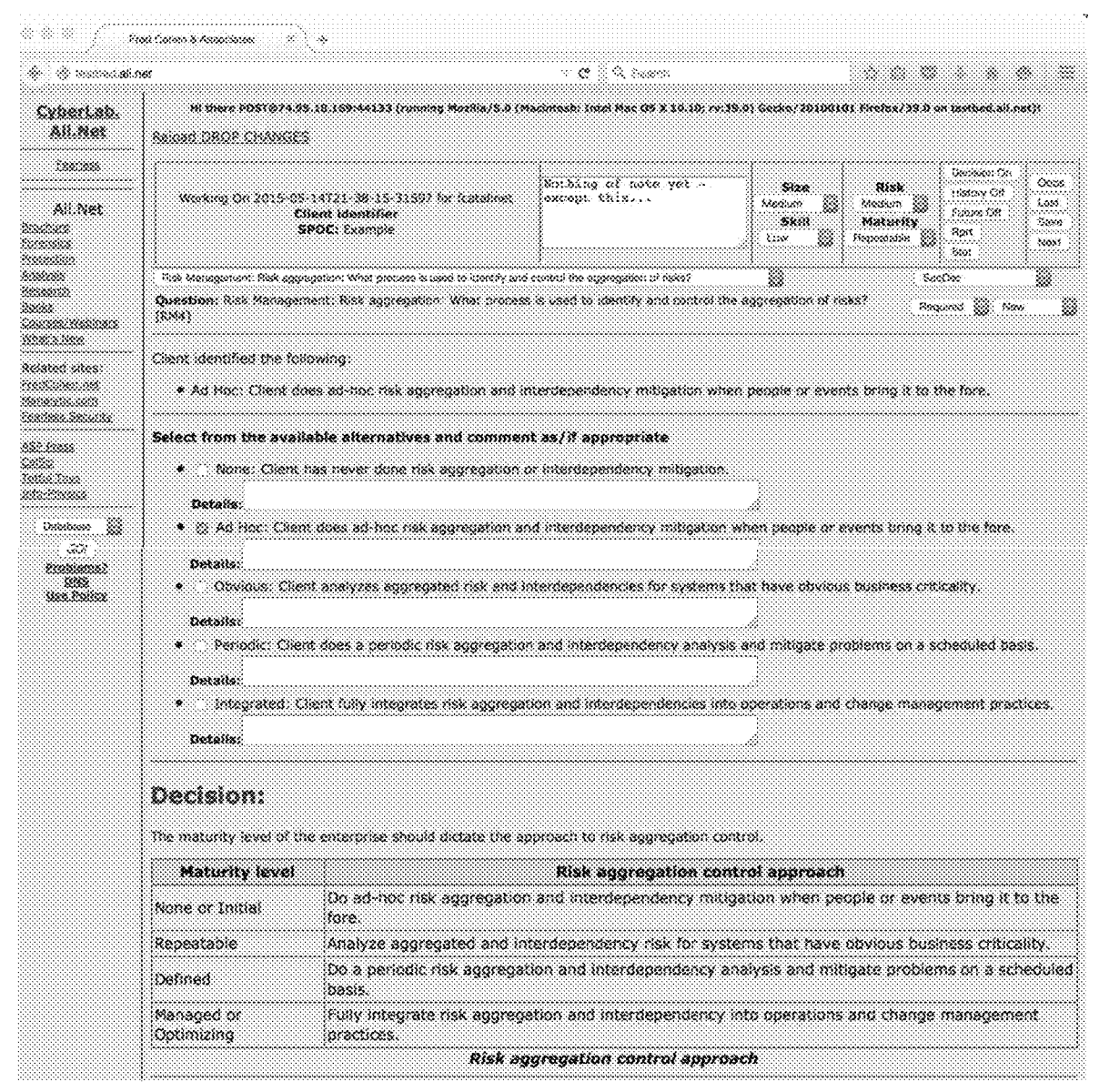

FIGS. 7A-B illustrate an example user interface for inputting data regarding maturity (e.g. as-is data) according to specific embodiments.

Figure 8A:
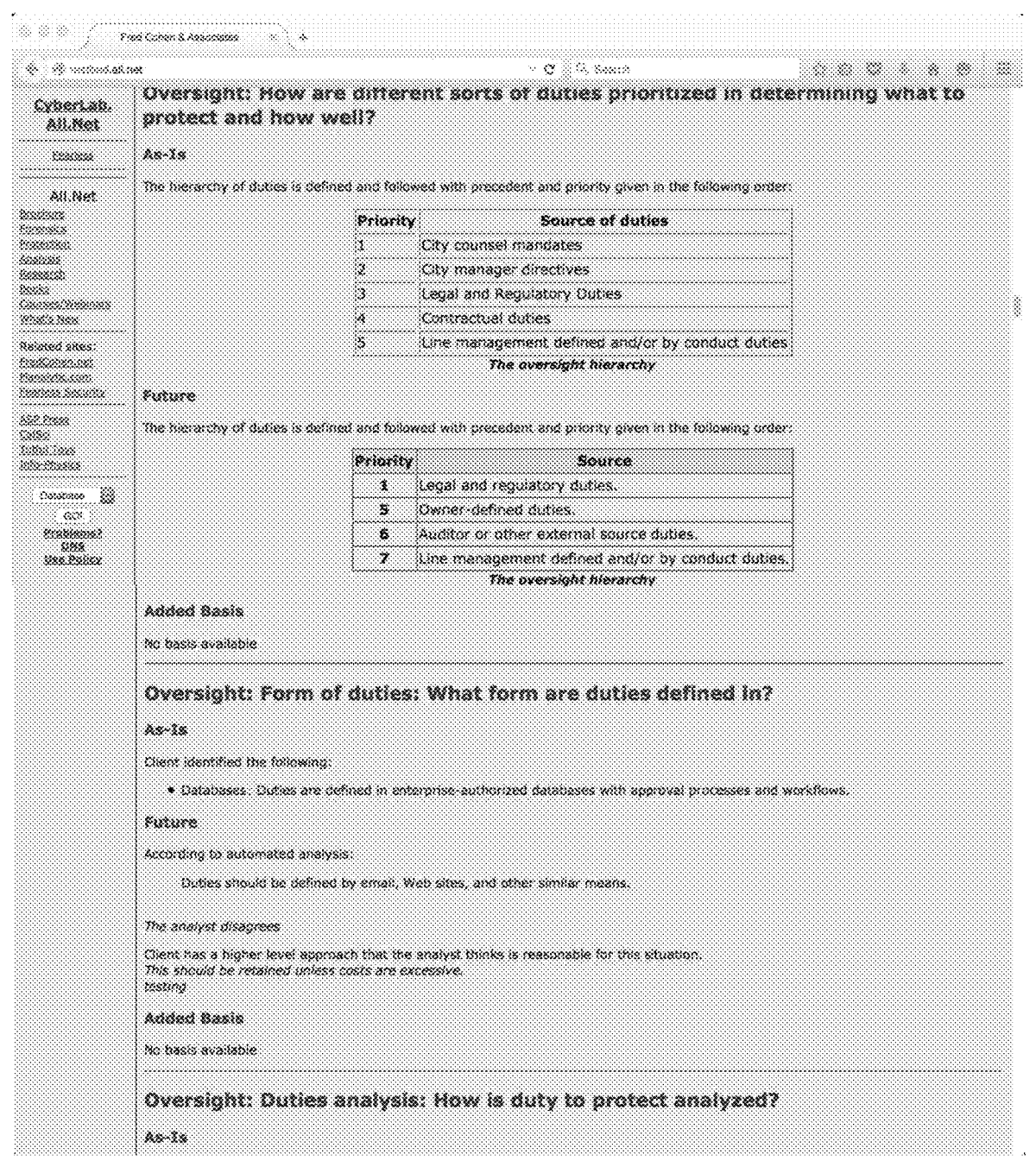
Figure 8B:
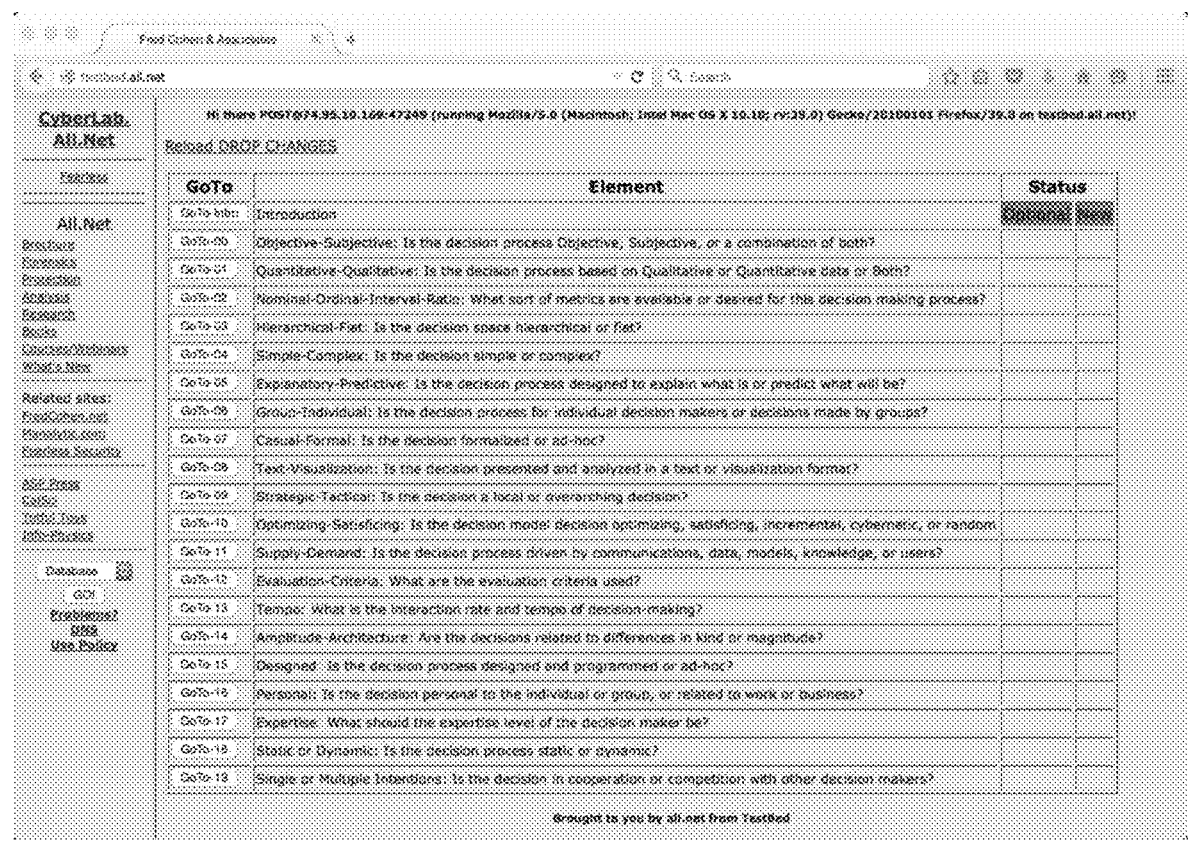
Figure 8C:
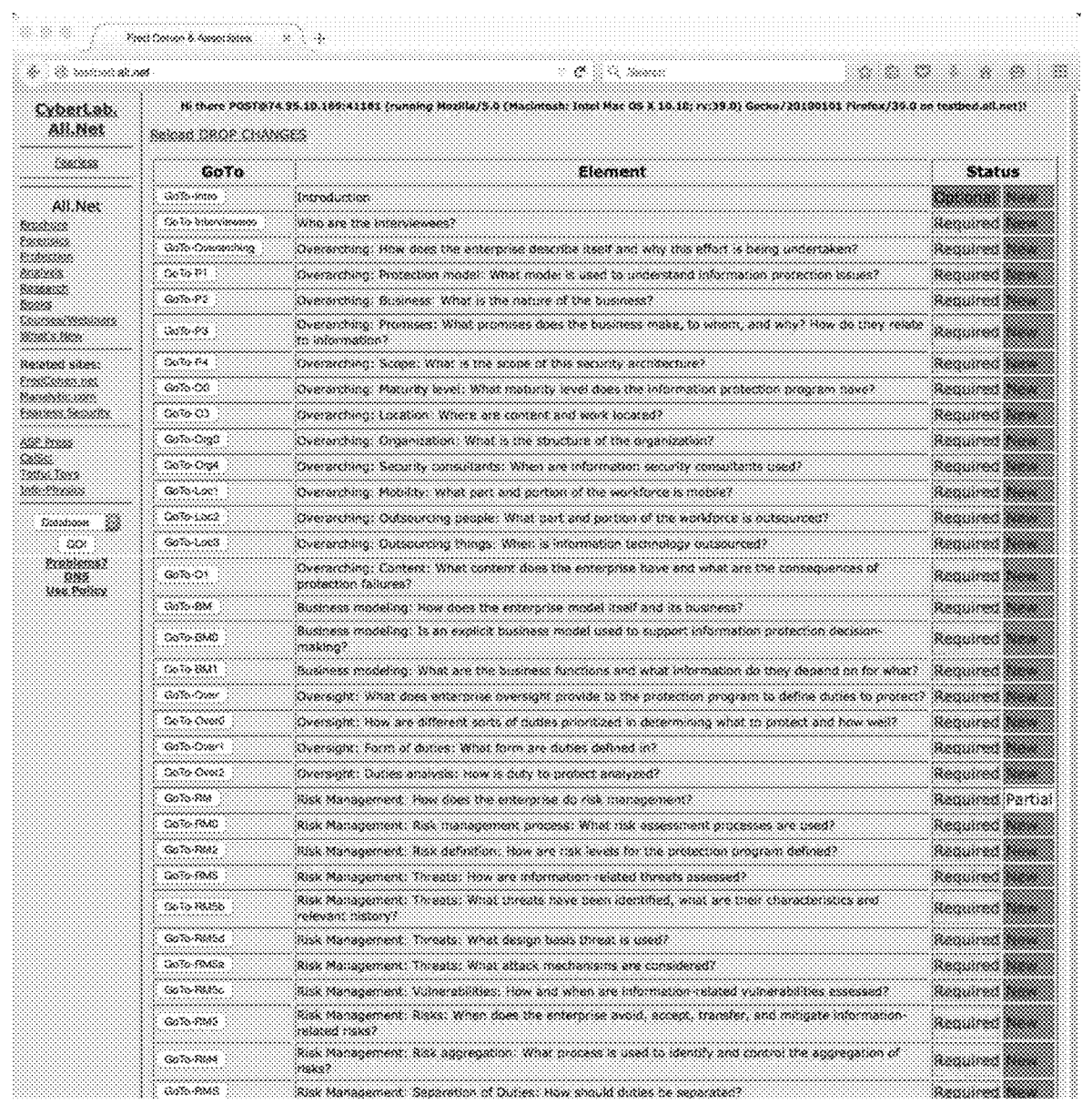

FIGS. 8A-C illustrate three examples of report outputs according to specific embodiments, including a general status report, a status report for a standard of practice surrounding decision-making, and a status report for security decisions variation standard of practice according to specific embodiments.

Figure 9A:
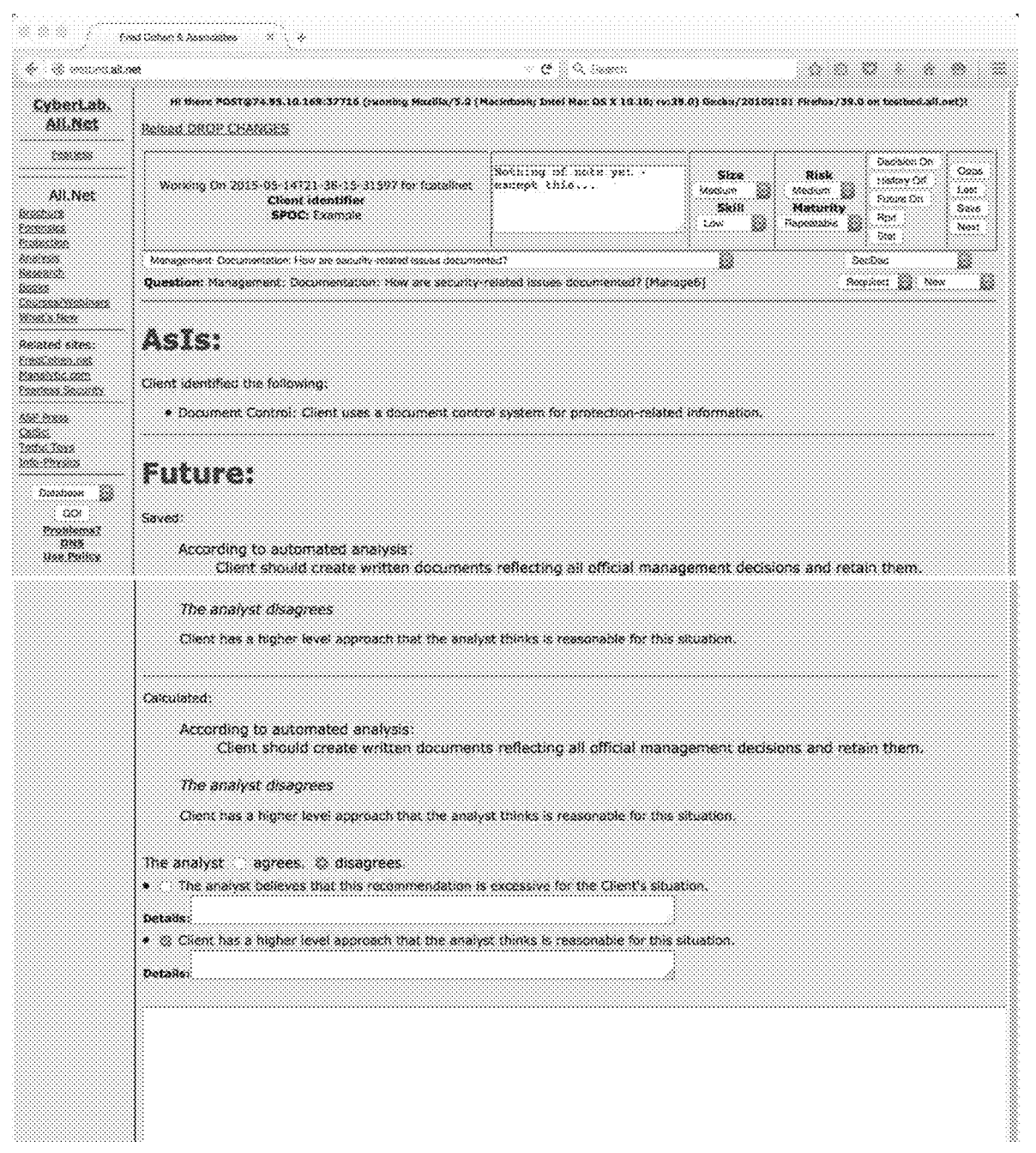

FIGS. 9A-B illustrate an example user interface showing automated rote analysis plus analyst input according to specific embodiments.

Figure 10A:
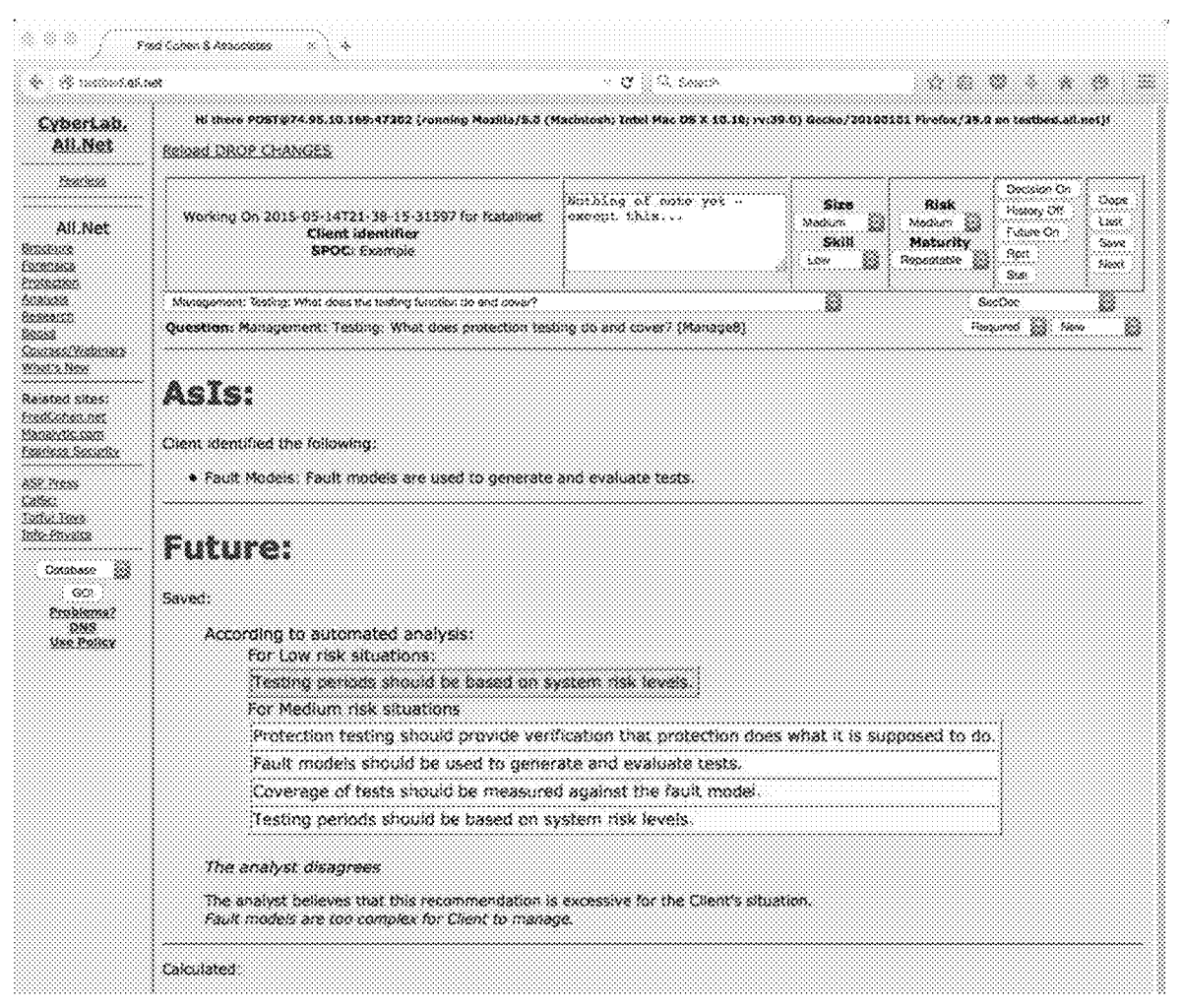
Figure 10B:
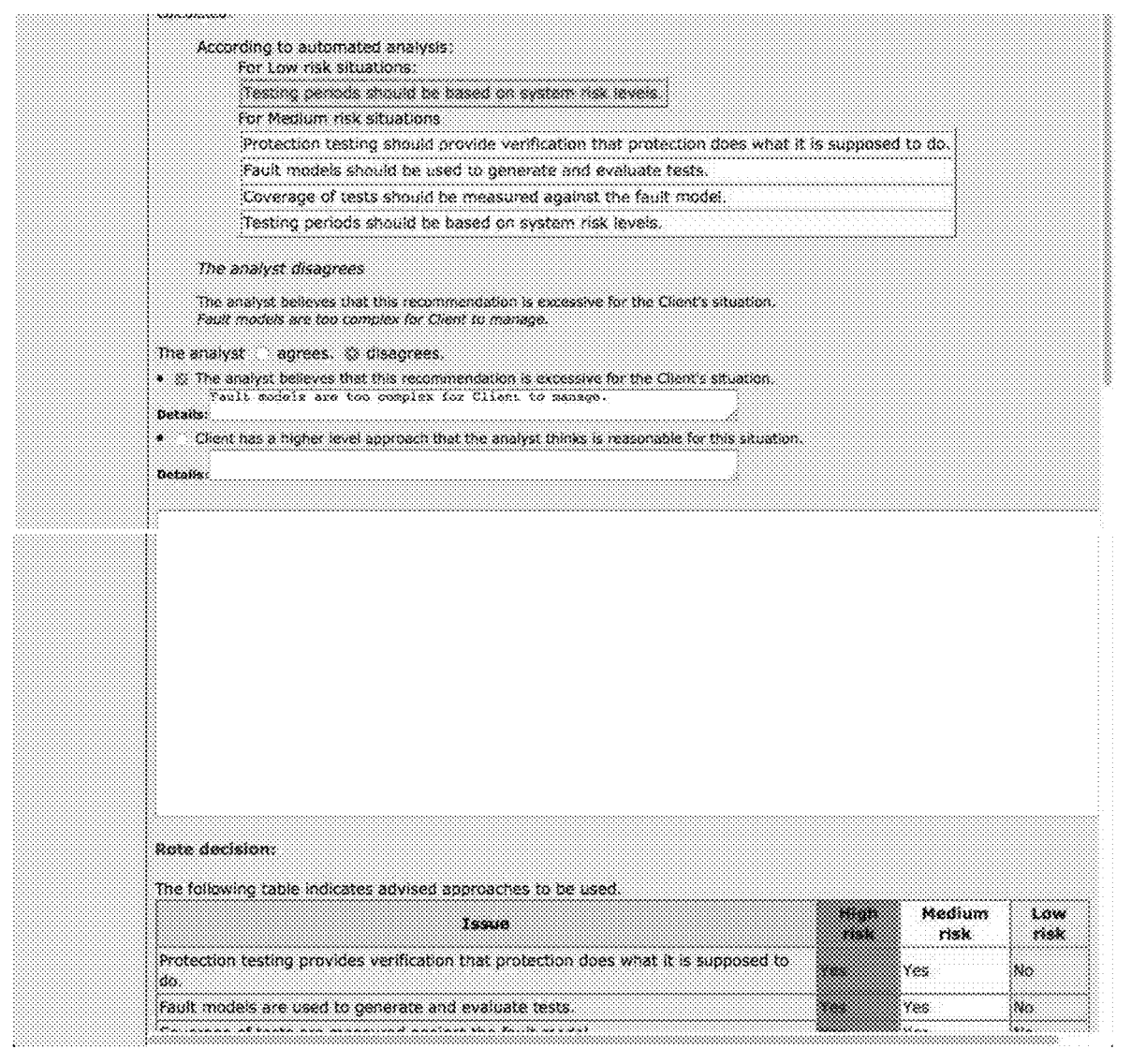

FIGS. 10A-B illustrate an example user interface showing future testing rote plus analysis input according to specific embodiments.

Figure 11A:
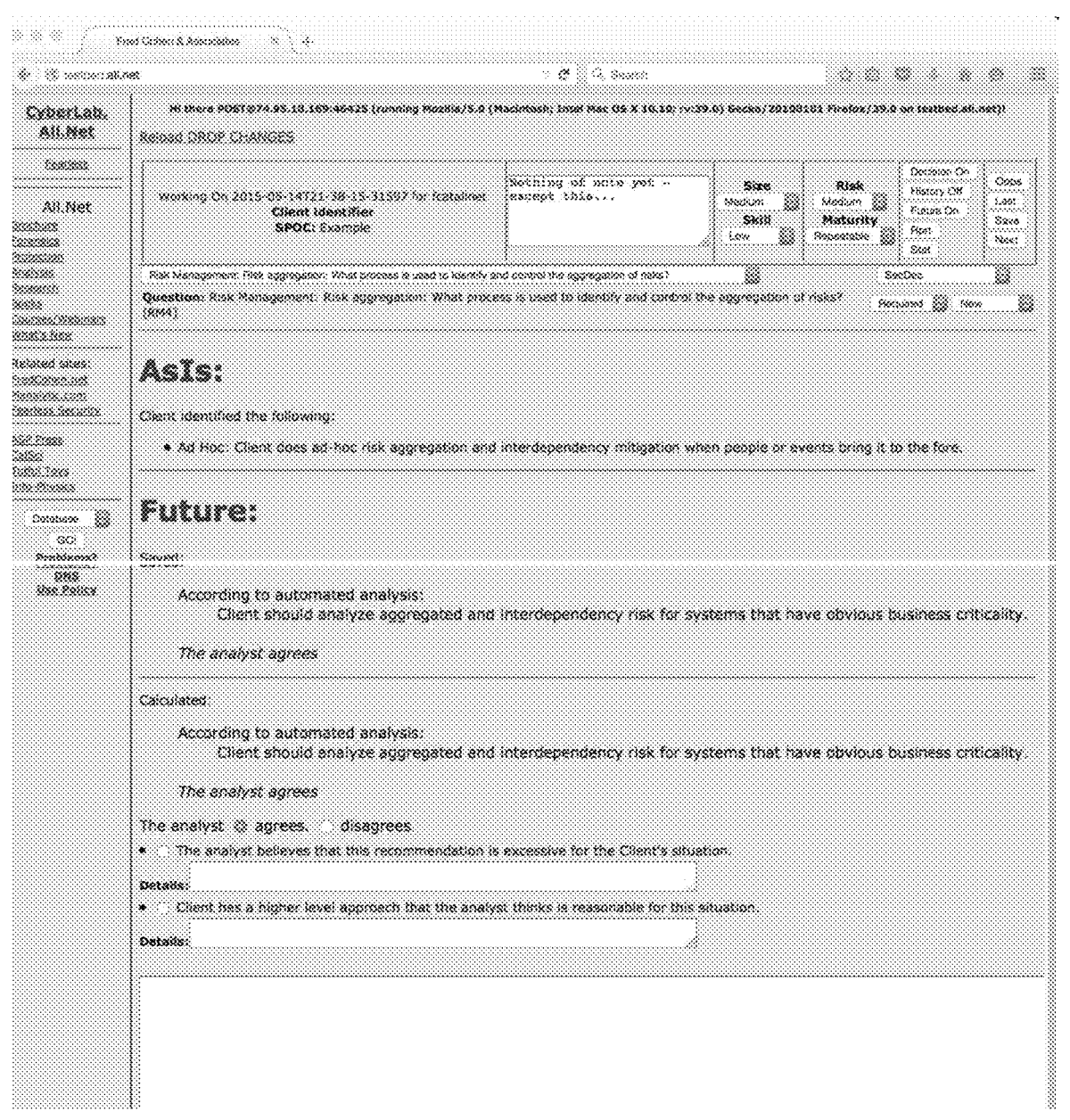

FIGS. 11A-B illustrate an example user interface showing maturity rote plus analysis input according to specific embodiments.

FIG. 12 illustrates an example user interface showing a list of assessments according to specific embodiments.

Figure 13:
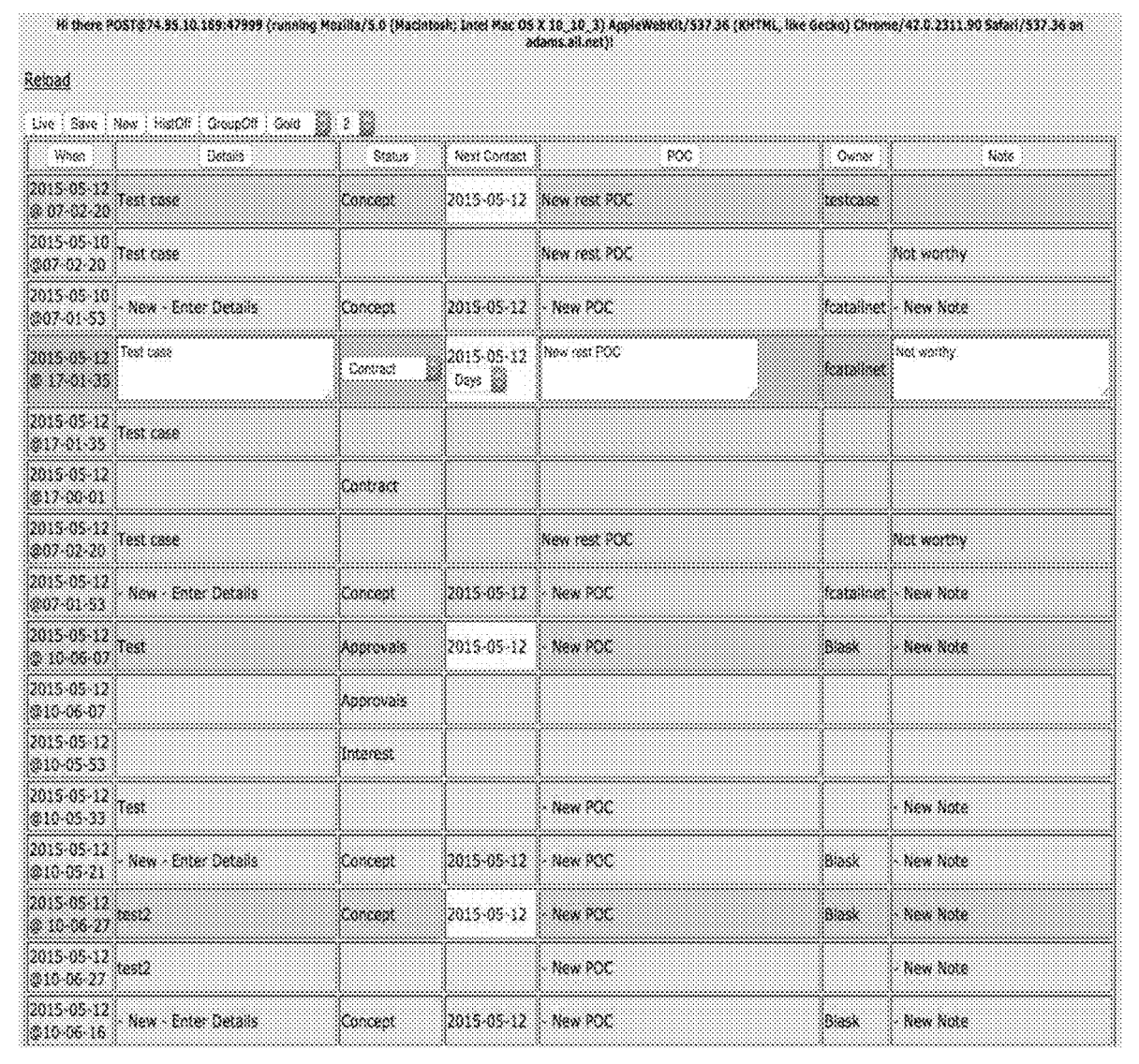

FIG. 13 is a diagram illustrating an example screen for tracking multiple assessments (gigs) in an example with a high volume of assessments and illustrates screens for tracking and management.

DETAILED DESCRIPTION OF ONE OR MORE EMBODIMENTS

Figure 3B:
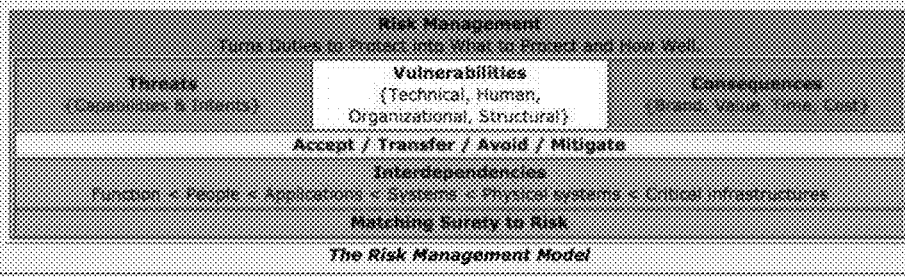
Figure 6B:
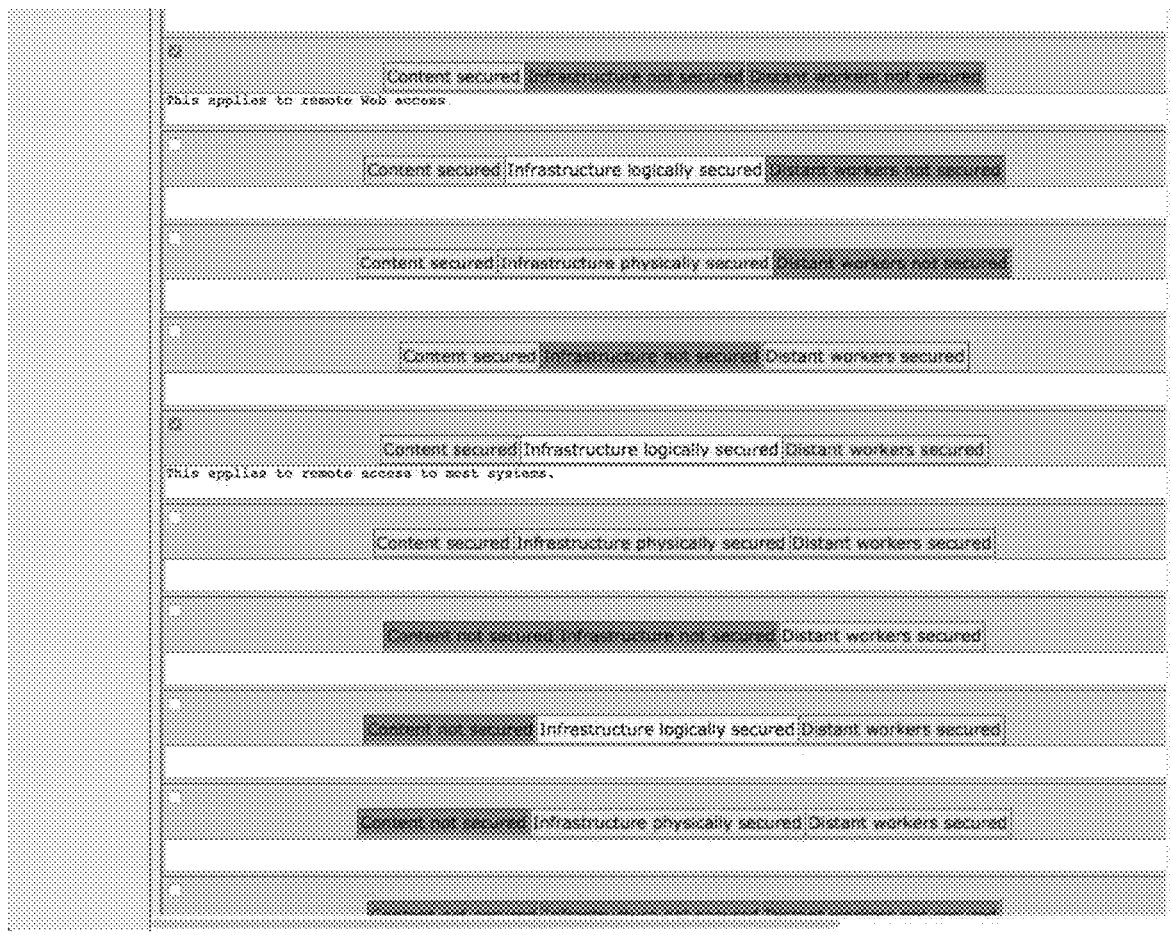

According to specific embodiments, the disclosure is involved with methods and/or systems and/or devices that can be used together or independently to provide cyber security assessments using one or more computer systems or other information processing systems or methods. This description introduces a selection of concepts that are further described or can be further understood from other papers submitted with this application. Key features or essential features of the claimed subject matter are discussed throughout this submission including in the appendix, thus no individual part of this submission is intended to determine the scope of the claimed subject matter. In light of the above, systems and/or methods are described herein that enable scalable cyber-security assessments and other complex sorts of assessments that can reach hundreds of thousands or millions of entities at far lower costs and in practical time frames.

According to specific embodiments, the disclosure is involved with methods and/or systems and/or devices that can be used together or independently to provide highly scalable cyber-security assessments and other sorts of complex assessments using one or more computer systems or other information processing systems or methods with vertically skilled assessment personnel. In specific embodiments, the assessment methodology is implemented with specially trained operators applying technical capabilities in conjunction with large numbers of clients over an extended period of time and on a repeating cycle.

Glossary

This working glossary is provided to further elucidate specific embodiments and examples of systems and methods and described herein. In all cases, terms used herein are intended to be given their broadest possible meaning consistent with the understanding of those of skill in the art and the teachings of this disclosure.

Standard of Practice (SoP) as used herein generally indicates sets of interdependent situational information elements, decisions relating to those information elements selected from finite sets of alternatives, where such decisions are reasonable and prudent in context, and where a basis for those decisions exists. There are different standards of practice for different sets of contexts. One or more standards of practice according to specific embodiments can consist of a set of potentially interrelated issues or decisions stored in a memory accessible to the computer system. According to specific embodiments, elements of the standards of practice are applied based on presented information. According to specific embodiments, standards of practice can be applied using automated analysis by an automated data processing system using information based on the specified situation and applying the standard of practice elements to that information in order to automatically produce results. According to specific embodiments, different elements, which indicate individual or sets of decisions contained with the standard of practice being applied, can be applied by one or more persons, but potentially any number of people with proper expertise perform different applications individually, in groups, or otherwise working in groups over extended periods of time and generally not in a specific order or within specific limited time bounds. Standards of Practice can be described in various ways. According to specific embodiments, the methods described herein can employ Standards of Practice as described at the website all(.)net. Standards of Practice according to specific embodiments can be understood to comprise: a number of questions to be answered or decisions to be made, a finite set of alternatives for each question or decision, procedures for choosing between the alternatives, and a basis for making decisions or answering questions.

Security assessments as used herein generally indicates applications of a standard of practice relative to a specific security-related situation of a given organization or context.

Context as used herein generally indicates any data or information or conditions that are relevant to carrying out an SoP or making decisions within an SoP. Time, identity of a user, location of a device, results of previous assessments, results of one or more assessment or testing activity, consequence or risk levels present, maturity and size of an organization, etc. can all be context that affects how an SOP is carried out.

Assessment Personnel as used herein generally indicates people with specialized expertise in the assessment process or portions thereof.

Gather Situational Information as used herein generally indicates gathering information regarding information regarding one or more elements of the SoP in the contexts of each of the one or more parties being assessed.

Apply The Standard Of Practice To The Information Regarding The Multiple Parties as used herein generally indicates identifying the decisions identified by the various SoPs being applied to the multiple parties as reasonable and prudent for the different situations associated with each of those parties.

As-Is Information as used herein generally indicates the situational information gathered from the multiple parties associated with the information gathered for multiple parties for review. As-Is Information can be collected via an interview process for example undertaken over the Internet, via telephone, via other telecommunications means, or as a combination of these methods. Such information can be reviewed by the party or parties for accuracy during collection and/or prior to analysis and may be updated or changed over time, producing updated as-is information.

A Basis as used herein generally indicates a detailed rationale potentially including supporting details and/or references upon which the SoP decisions are based.

Rote Fashion as used herein generally indicates strictly according to the documented and codified SoP generally using only the information contained within the SoP and without additional judgment.

Overview

While the prior art methods discussed earlier have worked with small numbers of assessments at high individual prices, using them in high volume is problematic for several reasons. Among these reasons are the large number of potential clients relative to the available expertise, the high cost of each assessment relative to the size and financial capacity of many potential clients, the wide variety of different business circumstances, and the wide range of standards and approaches that may be applied for different purposes.

The challenges in the cyber-security arena span many other areas. For example, there are standards (not standards of practice as defined herein) for information protection that vary significantly across the world, many or most of which are very complex and involve a great deal of judgment on a case-by-case basis, there are various metrics that are proposed that do not relate to risk factors, a wide array of information which is too complex or poorly known to be effectively gathered, and there are many different audit, review, and decision-making processes that produce different results in the same circumstances or when applied by different people. Expertise varies greatly across the field, there is no global or regional consensus on most elements at issue, and the lack of reporting about incidents and circumstances makes statistical analysis of little value in evaluating any particular situation.

In-depth assessments have been used for reviewing protection for large enterprises for many years. These studies typically take months to complete, cost hundreds of thousands of dollars, and involve a great deal of individual judgment. While large enterprises use such efforts to seek to understand and/or improve their protection situation, these processes are too time consuming and expensive for most businesses and other organizations. Similarly, audits as a process have been problematic for making protection decisions, among other reasons, because of their cost, time taken, and lack of correlation identified between results and likelihood or magnitude of losses.

Recently, in seeking to address the issues of the difference between prudence and negligence, one of the co-inventors has developed sets of standards of practice in the security field and in other fields. Presently, these include specific versions for enterprise information protection, industrial control systems, a draft for archives and records management, and various other examples. Details are provided as appendices and references hereto. Further details are available at all(.)net/SoP/ICSSec/index.html, all(.)net/SoP/SecDec/index.html, and all(.)net/SoP/Archives/index.html. These standards of practice seek to reduce the cost and complexity of assessment and decision-making and typically allow a reduction in time and cost of assessments so that they can be completed in ten days for a cost of tens of thousands of dollars.

The basic principal of this approach is that a finite number of decisions must be made about a protection program for an enterprise, and that these decisions are generally selections between small numbers of alternatives. By characterizing these decisions and alternatives then identifying the information they depend upon (for example as in a standard of practice) situational information may be identified and gathered, decisions made, and this process completed in a relatively short time frame for lower cost and with results that are reflective of and accepted by a consensus of the relevant community of expertise. This information may be then used to identify reasonable and prudent approaches to protection or other areas of application.

In the creation and application of these standards of practice, issues identified have been found to include a variety of elements that are closely related to decisions that would reasonably affect outcomes under adverse events. For example, but without limit, the present versions of the standards of practice deal with issues like risk aggregation. They ask what the maximum loss sustained by any single incident, act, or actor is limited to and how separation of duties, architectural structures, and mechanisms are used to implement such limitation. Similarly, the standards of practice differentiate between different defensive methods based on quality or surety levels. Another example is the identification of times associated with mitigation of known vulnerabilities and the process by which knowledge of such vulnerabilities comes to be known. Further examples and general principals will be understood from the information provided herein and in the appendix.

From a scalability standpoint, moving from one person-year of effort and hundreds of thousands of dollars in expenses over a period of months to a person month of effort over ten days for tens of thousands of dollars (as identified in the previous patent application) is an order of magnitude improvement. While this extends assessments from thousands a year to tens of thousands a year, it still cannot be used to reach the many millions of organizations requiring assessments in any reasonable amount of time.

Systems and methods as described herein change the equation by trading off the broad expertise required by highly experienced experts in the previous methods with less trained and skilled personnel, augmenting their capacity with automation and ongoing support and training, and performing assessments on an industrial scale with a parallel pipelined approach. Rather than shorten the time to complete an assessment and thus retaining contextual information in the heads of specialists during the shortened period of the assessment process, longer assessment periods are used with contextual information stored and presented as used.

In this process, each assessment team covers a relatively small portion of the overall standard of practice and related assessment process each of many times over a relatively short period with a different client each time. This is supported by the use of a software tool that enables development and presentation of contextual information relevant to the areas under assessment for the specific client during the period of engagement with each client. This contextual information is retained for use by the next assessment process step at a later time. In the next assessment period, the set of clients under assessment go through a different set of elements of the relevant Standard of Practice but the assessment personnel retain and have immediate access to the contextual information required to support this portion of the assessment process.

Thus, according to specific embodiments, the present invention may be embodied as a method or process for using and applying standards of practice developed for a complex field such as cyber security, in order to provide highly scalable assessments.

It is only with the support of technical methods and apparatus that such a process can operate efficiently for high volumes of clients and support multiple individuals reliably performing portions of assessments.

These examples are intended to demonstrate specific instances of the claimed inventions but the inventions are not limited to those particular methods or provided information. As is clear to anyone skilled in the art, any and all of these methods may be applied to a wide range of different circumstances and situations and measured using a wide range of different measurement systems, rating systems, standards of practice, facts, calculation methods, gathered information, and other similar components. The examples themselves are produced by systems that are capable of being applied across a wide range of each of these and the specific examples are only a small subset of the possibilities supported by the example methods used to assist in the implementation of the process as described.

The invention may also be embodied as an apparatus or device (e.g., one or more processors and one or more digital memories) or system for collecting and storing data as described herein and for performing the analysis and output as described herein. An apparatus or system according to specific embodiments includes logic that responds to user input to operate as herein described.

The invention may also be embodied as a computer program product for performing assessments by using multiple personnel to apply standards of practice to an entity. The computer program product includes a computer readable tangible media embodying computer usable program code configured to enable applying the standards of practice to multiple entities (or clients) by multiple personnel.

Embodiment in a Programmed Information Appliance

Figures 14, 15:
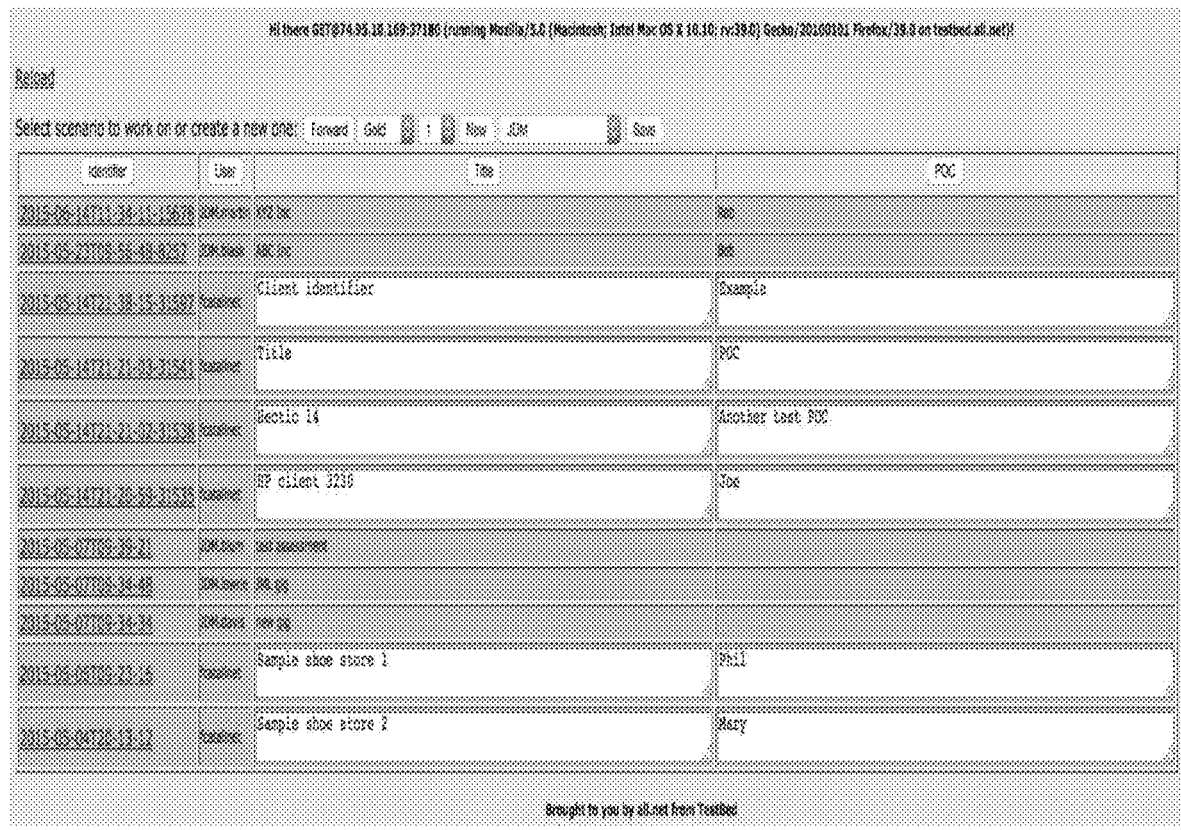
FIG. 14 is a diagram illustrating a second example screen for tracking multiple assessments (gigs) in an example with a high volume of assessments and illustrates screens for tracking and management.
FIG. 15 is a block diagram showing a representative example logic device in which various aspects of the present invention may be embodied.

FIG. 15 is a block diagram showing a representative example logic device in which various aspects of the present invention may be embodied. As will be understood to practitioners in the art from the teachings provided herein, specific embodiments can be implemented in hardware and/or software. In some embodiments, different aspects can be implemented in either client-side logic or server-side logic. As will be understood in the art, the invention or components thereof may be embodied in a fixed media program component containing logic instructions and/or data that when loaded into an appropriately configured computing device cause that device to perform according to specific embodiments. As will be understood in the art, a fixed media containing logic instructions may be delivered to a user on a fixed media for physically loading into a user's computer or a fixed media containing logic instructions may reside on a remote server that a user accesses through a communication medium in order to download a program component.

FIG. 15 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of specific embodiments as described herein. One type of logical apparatus that may embody the invention according to specific embodiments is a computer system as illustrated in 700, containing CPU 707, optional input devices 709 and 711; disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

Figure 16:
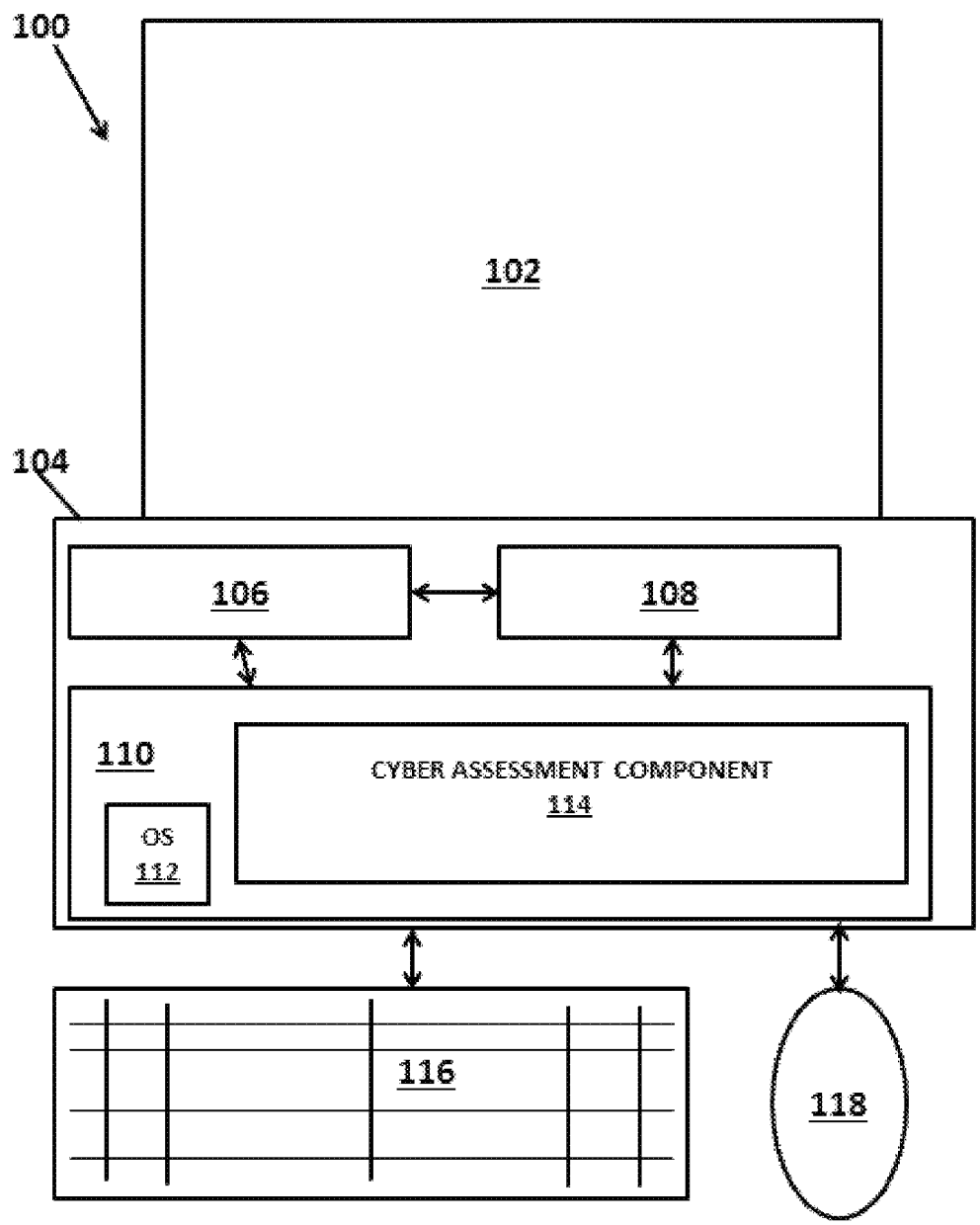
FIG. 16 is a block diagram of a computer system on which the cyber assessment system may be implemented.

In addition to the digital device shown in FIG. 15, the system and method may be implemented using a computer system 100 as shown in FIG. 16. The computer system 100 may be a personal computer, a laptop computer, a tablet computer, a mainframe computer and the like. A personal computer system example in shown in FIG. 16. When the computer system 100 is implemented as a personal computer/desktop computer, the computer system may have a display device 102 and a chassis/housing 104. The housing 104 may contain one or more processors (or logic processors) 106 that are coupled to a persistent storage device 108, such as flash memory or a hard disk drive, and a memory 110, such as DRAM or SRAM. The computer system may also have connectivity circuits that allow the computer system to communicate with other computer systems over a network or other communication path. The computer system may also have one or more input/output devices (such as for example a keyboard 116 and a mouse 118 as shown in FIG. 16) that allow a user to interact with the computer system. In the memory of the computer system may reside a known operating system 112 and a cyber assessment component 114 that implements the cyber assessment system and method described herein. In one embodiment, the cyber assessment component 114 may be a plurality of instructions that may be executed by the processor 106 of the computer system to implement the operations of the cyber assessment system described herein. In another embodiment, the cyber assessment component 114 may be a piece of hardware (not shown in FIG. 16), such as a microcontroller, state machine, programmed logic device and the like, that operates to implement the operations of the cyber assessment system described herein.

The cyber assessment component 114 may implement a method for performing multiple concurrent security assessments using the computer system 100. The method may include accessing one or more data sets indicating one or more standards of practice. Examples of the one or more data sets may be found in the Appendix that forms part of the specification and is incorporated herein by reference. The method may use one or more logic processors of the computer system to apply the one or more standards of practice to multiple parties by multiple assessment personnel in order to perform the following processes: (1) gather information regarding the multiple parties; (2) apply the standard of practice to the information regarding the multiple parties; (3) access and present "as-is" information associated with the information gathered for multiple parties for review; and (4) determine reasonable and prudent future state information based on the standard of practice for multiple parties and (5) present results associated with each of the parties to the appropriate such parties. Each of the processes is further detailed in the code contained in the Appendix that forms part of the specification.

In some embodiments, the standards of practice may be a number of questions to be answered or decisions to be made, a finite set of alternatives for each question or decision, procedures for choosing between the alternatives and a basis for making decisions or answering questions as disclosed in the Appendix that forms part of the specification. The standards of practice may also be a set of variable aspects of an entity and guidelines for a desired state of those aspects.

The cyber assessment method and system may use the logic processor of the computer system to apply one or more standards of practice to multiple parties (clients) by presenting subsets of a standard of practice and context information to multiple assessment personnel as disclosed in more detail in the source code appendix that forms parts of the specification. The application of the one or more standards of practice may include applying one or more standard of practice in subparts under direction of less trained and less skilled personnel, augmenting the personnel capacity with automation and ongoing support and training and performing assessments on an industrial scale using a parallel-pipelined approach wherein any individual personnel directs similar subportions of standards of practice application for multiple parties (clients). The application of the one or more standards of practice may also include performing an assessment over longer periods of time allowing multiple personnel to perform subparts of a standard of practice with contextual information stored and presented as needed by the computer systems as shown in more detail in the source code appendix. The application of the one or more standards of practice may also include one or more assessment team covering a relatively small portion of the overall standard of practice and related assessment process many times over a relatively short period with a different client or party each time as shown in more detail in the source code appendix.

The cyber assessment system and method may further include a software tool that enables development and presentation of contextual information relevant to the areas under assessment for the specific client during the period of engagement with each client as shown in more detail in the source code appendix. The software tool may retain contextual information for use by the next assessment process step at a later time.

The cyber assessment system and method may further include dividing the assessment process into multiple assessment periods, wherein in an assessment period the set of clients under assessment go through a different set of elements of the relevant standard of practice but the assessment personnel retain and have immediate access to the contextual information required to support this portion of the assessment process. The cyber assessment system and method may further include using the assessment and applying standards of practice developed for a complex field such as cyber security in order to provide highly scalable assessments. The cyber assessment system and method may facilitate assessments for high volumes of clients and supports multiple individuals reliably performing portions of assessments.

The one or more standards of practice in the cyber assessment system and method may include a set of inter-related issues or decisions regarding cyber security practices and systems of an enterprise stored in a memory accessible to the computer system. Some of the issues or decisions about cyber assessment contain finite alternatives and decision-making methods associated with the situation and the alternatives. The cyber assessment system may provide a basis for the selection of alternatives as disclosed in more detail in the Appendix.

In the cyber assessment system and method, different elements of the standard of practice may be applied by one or more people over extended periods of time. In addition, the standards of practice may be applied using automated analysis as disclosed in more detail in the Appendix. In some embodiments, the standards of practice may be applied in a rote fashion using only the information contained within the standard of practice and without additional judgment. The cyber assessment system and method provides human assessment personnel with suggested future states and the ability to apply those suggestions or replace them with human judgment.

In the cyber assessment system and method, the elements of the standards of practice are applied based on presented information. In the cyber assessment system and method, the as-is information is provided in a written, digital, paper, application, database, or other material form. In the cyber assessment system and method, information gathered by interview and/or inspection processes is incorporated into a memory of the computer system and the interview process is undertaken over the Internet, via telephone, via other telecommunications means, or as a combination of these methods. In the cyber assessment system and method, the information gathered is reviewed by the party or parties for accuracy prior to analysis or is updated or changed over time, producing updated as-is information. The information that is gathered over time and changes to the information are used to produce new or updated application of the standard of practice, providing of new or updated as-is information, and/or updated analysis or results as disclosed in more details in the Appendix.

In the cyber assessment system and method, the standards of practice are adapted over time based on outcomes, feedback, or additional expertise. The adaptation of the standards of practice over time are used to provide updated analysis and/or results. A periodic process may be used to update the information gathered. In the cyber assessment system and method, a testing and/or analysis process is used to determine and/or update elements of the standard of practice. In the cyber assessment system and method, the information is provided to the parties to help them better understand the standards of practice, its application, the basis for analysis as disclosed in more detail in the Appendix.

In the cyber assessment system and method, the different standards of practice are used for evaluations of different organizations, circumstances, applications, or situations. In the cyber assessment system and method, access to the one or more standards of practice applied to the multiple parties by the multiple assessment personnel are managed and/or controlled by one or more of a set of roles and rules, hierarchical structures, access control lists, or other similar methods. The one or more managers are able to assign personnel to assessments, and remove personnel from assessments and/or the one or more managers are able to grant and/or deny read and/or modify access of personnel to assessments and/or the one or more managers are able to take, grant, or revoke control of assessments and/or the ability to perform such management functions. In the system, the scheduling, notes, and other information related to assessment are able to be made, retained, modified, and viewed by authorized personnel as disclosed in more detail in the Appendix.

In the cyber assessment system and method, historical information on the assessment process, as-is, future state, and other related information is retained and viewable to authorized personnel. The assessment process supports reversion to previous versions of stored historical data. In the system, multiple servers, repositories, and infrastructure are used to replicate assessment information and capabilities so as to allow assessment processes to continue when an outage occurs involving one or more computer systems, data sets, and/or assessment personnel with minimal inconvenience to the parties being assessed and minimal loss of assessment-related information as disclosed in more detail in the Appendix.

In the method, the gathering process uses checklists, checkboxes, tables, sentence fragments, sentences, pictorials, graphical arrangements, text, or other presented forms. The assessment personnel may selectively add or remove information to the presented forms. The subjects of assessments may be given information about one or more elements of the standards of practice and the gathering may be performed by those subjects directly providing information about themselves. In the method, the step of determining may perform comparisons of information entered to standards of practice rote analysis and identifies differences between the entered data and the rote standard of practice advise to perform the step of presenting. In the system, the steps of determining and presenting may be performed as the step of gathering is completed and presented on the output device or the display of the computer system.

In the method, presenting results may consist of presenting results of one or more elements of the standards of practice in one or more formats. The process through elements of the standards of practice and/or their state of completion are stored and presented. A system facilitating scalable assessments comprising: a memory storing instructions; and a processor configured to execute the instructions to perform the method described above. The system may have a memory storing instructions and the processor configured to execute the instructions to perform the method described above. The cyber assessment may also be implemented in a non-transitory digital medium configured with logic instructions that when executed enable an appropriately configure computer system to perform the cyber assessment method described above.

Software Implementations

Various specific embodiments provide methods and/or systems for assessments that can be implemented on a general purpose or special purpose information handling appliance or logic enabled system, such as a laboratory or diagnostic or production system, using a suitable programming language such as Java, Perl, C++, C#, Cobol, C, Pascal, Fortran. PL1, LISP, assembly, etc., and any suitable data or formatting specifications, such as HTML, XML, dHTML, TIFF, JPEG, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

It is well known in the art that logic systems and methods such as described herein can include a variety of different components and different functions in a modular fashion. Different example specific embodiments and implementations can include different mixtures of elements and functions and may group various functions as parts of various elements. For purposes of clarity, embodiments of the invention are described in terms of systems that include many different innovative components and innovative combinations of innovative components and known components. No inference should be taken to limit the claimed invention to combinations containing all of the innovative components listed in any illustrative embodiment in this specification.

All references, publications, patents, and patent applications cited herein are hereby incorporated by reference in their entirety for all purposes.

The general structure and techniques, and more specific embodiments that can be used to effect different ways of carrying out the more general goals are described herein. Although only a few embodiments have been disclosed in detail herein, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative that might be predictable to a person having ordinary skill in the art.

The inventors intend that only those claims which use the words "means for" are intended to be interpreted under 35 U.S.C. § 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, mobile telephone, or laptop or any other computer that may come to exist over time with similar capabilities.

The programs may be written in C or Python, or Java, Perl, Brew or any other programming language or may be directly embedded in hardware, implemented directly as finite state machines, or in any other form. The programs may be resident on a storage medium, e.g., magnetic or optical, e.g., the computer hard drive, a removable disk or media such as a memory stick or SD media, wired or wireless network based or BLUETOOTH® based Network Attached Storage (NAS), or other removable medium, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

Specific embodiments also may be embodied in whole or in part within the circuitry of an application specific integrated circuit (ASIC) or a programmable logic device (PLD). In such a case, specific embodiments may be embodied in a computer understandable descriptor language, which may be used to create an ASIC, or PLD that operates as herein described.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method for performing multiple concurrent assessments for multiple parties using a computer system having a memory and a hardware processor, the method comprising:
    retrieving, by the computer system having the memory and the hardware processor, one or more data sets, wherein each data set includes a standard of practice for each assessment, each assessment standard of practice further comprises one or more decisions, a finite number of alternative actions for each decision, a procedure for choosing between the finite number of alternative actions, and a basis for making the one or more decisions about an assessment for a party; and
    executing a plurality of instructions by the hardware processor that is configured to:
        gather a plurality of decision-making factors for each party of the multiple parties;
        adjust a performance of the assessment standard of practice for said each party based on the decision-making factors for said each party to generate a particular assessment standard of practice for said each party;
        apply the particular assessment standard of practice generated for said each party to said each party of the multiple parties to generate a particular assessment decision for said each party of the multiple parties based on the plurality of decision-making factors for said each party;
        access as-is information for said each party based on the gathered plurality of decision-making factors for that party;
        determine future state information for said each party of the multiple parties including the particular assessment decision based on the particular assessment standard of practice for each of the multiple parties;
        retain, by a software tool, contextual information for use by a next assessment process at a later time;
        output one or more of the as-is information, the future state information and the particular assessment decision for said each party of the multiple parties; and
        adapt the standard of practice over time based on an outcome, a feedback or an additional expertise to generate an updated standard of practice and retrieving the updated standard of practice to perform the assessment of said each party.

2. The method of claim 1, wherein the assessment standard of practice further comprises;
    one or more questions or one or more decisions to be made;
    a set of alternatives for each question or decision;
    one or more procedures for choosing between the set of alternatives for said each question or decision; and
    a basis for making each of the one or more decisions or answering each of the one or more questions.

3. The method of claim 1, wherein the particular assessment standard of practice for said each party further comprises:
    a set of variable aspects of an entity; and
    one or more guidelines for a desired state of those variable aspects.

4. The method of claim 1, wherein applying the particular assessment standard of practice for said each party further comprises:
applying the particular assessment standard of practice in subparts under direction of less trained and less skilled personnel;
augmenting a personnel capacity with automation and ongoing support and training; and
performing assessments on an industrial scale using a parallel-pipelined approach wherein any individual personnel directs similar sub-portions of the standard of practice application for one or more parties.

5. The method of claim 1, wherein the applying the particular assessment standard of practice for said each party further comprises:
performing an assessment over a longer period of time allowing multiple personnel to perform subparts of the particular assessment standard of practice with the contextual information stored and presented as needed by the computer system.

6. The method of claim 1, wherein applying of the particular assessment standard of practice for said each party further comprises:
using one or more assessment teams that each cover a relatively small portion of the particular assessment standard of practice and related assessment process many times over a relatively short period with a different party each time.

7. The method of claim 1, further comprising:
dividing an assessment process into multiple assessment periods, wherein, in an assessment period, the set of parties under assessment go through a different set of elements of the particular assessment standard of practice but the assessment personnel retain and have immediate access to the contextual information required to support this portion of the assessment process.

8. The method of claim 1, further comprising:
facilitating assessments for a plurality of parties and supporting a plurality of personnel reliably performing portions of the assessments.

9. The method of claim 1, wherein the particular assessment standard of practice for said each party further comprises:
a set of interrelated issues or decisions regarding cyber security practices and systems of an enterprise stored in another memory accessible to the computer system.

10. The method of claim 1, further comprising: presenting a result of the particular assessment decision that further comprises:
presenting finite alternatives and decision-making methods associated with a situation and the finite alternatives.

11. The method of claim 10, wherein a basis is provided for a selection from the finite alternatives.

12. The method of claim 1, further comprising:
performing multiple security assessments sharing standard of practice elements that are performed retaining information associated with elements and applying them to said multiple assessments.

13. The method of claim 1, further comprising:
developing and presenting, by the software tool, the contextual information relevant to areas under assessment for said each party during a period of engagement with said each party.

14. The method of claim 1, wherein gathering the plurality of decision-making factors further comprises:

performing an interview process using one or more of an Internet, a telephone, and/or a telecommunications system.

15. A system facilitating scalable assessments for a plurality of parties, the system comprising:
a software tool that retains contextual information for use by a next assessment process at a later time;
a memory storing a plurality of instructions; and
a hardware processor configured to execute the plurality of instructions so that the hardware processor is configured to:
access a standard of practice for each assessment, each assessment standard of practice further comprises one or more decisions, a finite number of alternative actions for each decision, a procedure for choosing between the finite number of alternative actions, and a basis for making the one or more decisions about an assessment for a company;
gather a plurality of decision-making factors for each party of the plurality of parties;
adjust a performance of the assessment standard of practice for said each party based on the decision-making factors for said each party to generate a particular assessment standard of practice for said each party;
apply the particular assessment standard of practice generated for said each party to said each party of the multiple parties to generate a particular assessment decision for said each party of the multiple parties based on the plurality of decision-making factors for said each party;
access as-is information for said each party based on the gathered plurality of decision-making factors for that party;
determine future state information for said each party of the multiple parties including the particular assessment decision based on the particular assessment standard of practice for each of the multiple parties;
output one or more of the as-is information, the future state information and the particular assessment decision for said each party of the multiple parties; and
adapt the standard of practice over time based on an outcome, a feedback or an additional expertise to generate an updated standard of practice and retrieving the updated standard of practice to perform the assessment of said each party.

16. The system of claim 15, wherein the assessment standard of practice further comprises:
one or more questions or one or more decisions to be made;
a set of alternatives for each question or decision;
one or more procedures for choosing between the set of alternatives for said each question or decision; and
a basis for making each of the one or more decisions or answering each of the one or more questions.

17. The system of claim 15, wherein the particular assessment standard of practice for said each party further comprises:
a set of variable aspects of an entity; and
one or more guidelines for a desired state of those variable aspects.

18. The system of claim 15, wherein the hardware processor is further configured to:
apply the particular assessment standard of practice for said each party in subparts under direction of less trained and less skilled personnel;

augment a personnel capacity with automation and ongoing support and training; and perform assessments on an industrial scale using a parallel-pipelined approach wherein any individual personnel directs similar sub-portions of the standard of practice application for one or more parties.

19. The system of claim 15, wherein the hardware processor is further configured to:

perform an assessment over a longer period of time allowing multiple personnel to perform subparts of the particular assessment standard of practice with the contextual information stored and presented as needed by the system.

20. The system of claim 15, wherein the hardware processor is further configured to:

use one or more assessment teams that each cover a relatively small portion of the overall particular standard of practice and related assessment process many times over a relatively short period with a different party each time.

21. The system of claim 15, wherein the hardware processor is further configured to:

divide the assessment process into multiple assessment periods, wherein, in an assessment period, the set of parties under assessment go through a different set of elements of the particular assessment standard of practice but the assessment personnel retain and have immediate access to the contextual information required to support this portion of the assessment process.

22. The system of claim 15, wherein the hardware processor is further configured to:

facilitate assessments for a plurality of parties and support a plurality of personnel reliably performing portions of the assessments.

23. The system of claim 15, wherein the particular assessment standard of practice for said each party further comprises:

a set of interrelated issues or decisions regarding cyber security practices and systems of an enterprise stored in the memory.

24. The system of claim 15, wherein the hardware processor is further configured to:

present finite alternatives and decision-making methods associated with a situation and the finite alternatives.

25. The system of claim 24, wherein a basis is provided for a selection from the finite alternatives.

26. The system of claim 15, wherein the hardware processor is further configured to:

perform multiple security assessments sharing standard of practice elements that are performed retaining information associated with elements and applying them to said multiple assessments.

27. The system of claim 15, wherein the hardware processor is further configured to:

develop and present, by the software tool, the contextual information relevant to areas under assessment for said each party during a period of engagement with said each party.

28. The system of claim 15, wherein the hardware processor is further configured to:

perform an interview process to gather the plurality of decision-making factors using one or more of an Internet, a telephone, and a telecommunications system.

* * * * *